United States Patent
Yamasaki et al.

(10) Patent No.: US 10,982,117 B2
(45) Date of Patent: Apr. 20, 2021

(54) ADHESIVE MATERIAL AND PRESSURE-BONDED PRINT

(71) Applicant: FUJI XEROX CO., LTD., Tokyo (JP)

(72) Inventors: Sumiaki Yamasaki, Kanagawa (JP); Shiori Chonan, Kanagawa (JP); Yasuo Matsumura, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 35 days.

(21) Appl. No.: 16/150,390

(22) Filed: Oct. 3, 2018

(65) Prior Publication Data
US 2019/0292412 A1 Sep. 26, 2019

(30) Foreign Application Priority Data
Mar. 23, 2018 (JP) .............................. JP2018-057204

(51) Int. Cl.
*C09J 7/38* (2018.01)
*C09J 125/06* (2006.01)
*C09J 4/06* (2006.01)
*C09J 133/10* (2006.01)

(52) U.S. Cl.
CPC ................ *C09J 7/385* (2018.01); *C09J 4/06* (2013.01); *C09J 125/06* (2013.01); *C09J 133/10* (2013.01); *C09J 2301/50* (2020.08)

(58) Field of Classification Search
CPC ....... C09J 133/10; C09J 125/06; C09J 125/04
See application file for complete search history.

(56) References Cited

U.S. PATENT DOCUMENTS

| 3,823,205 A | * | 7/1974 | Zimmt | C09D 133/10 |
| | | | | 525/228 |
| 2016/0376420 A1 | * | 12/2016 | Yano | C09K 3/1006 |
| | | | | 524/297 |

FOREIGN PATENT DOCUMENTS

| JP | 2005-350575 A | 12/2005 |
| JP | 2008-209489 A | 9/2008 |
| JP | 2008-233763 A | 10/2008 |
| JP | 4471334 B2 | 6/2010 |
| JP | 4582734 B2 | 11/2010 |
| JP | 2015218305 A | * 12/2015 |

OTHER PUBLICATIONS

Franck (Characterizing PSAs by Rheology: TA Instruments; www.adhesivesmag.com) (Year: 2005).*

* cited by examiner

Primary Examiner — Alicia J Sawdon
(74) Attorney, Agent, or Firm — Sughrue Mion, PLLC

(57) ABSTRACT

An adhesive material contains a styrene resin, a (meth)acrylate resin, and an oxidatively polymerizable compound, wherein the adhesive material has a sea-island structure that includes a sea portion containing the styrene resin and an island portion containing the (meth)acrylate resin, and the glass transition temperature of the (meth)acrylate resin is at least 30° C. lower than the glass transition temperature of the styrene resin.

19 Claims, 3 Drawing Sheets

ABSTRACT

ADHESIVE MATERIAL AND PRESSURE-BONDED PRINT

CROSS-REFERENCE TO RELATED APPLICATIONS

This application is based on and claims priority under 35 USC 119 from Japanese Patent Application No. 2018-057204 filed Mar. 23, 2018.

BACKGROUND

(i) Technical Field

The present disclosure relates to an adhesive material and a pressure-bonded print.

(ii) Related Art

A postcard-size pressure-bonded print is called "pressure-bonded postcard". The pressure-bonded postcard can be sent at the same postage as general postcards. The pressure-bonded postcard is therefore used instead of a sealed letter, and the seal of the pressure-bonded postcard can be removed to read a description on the postcard. The pressure-bonded postcard is delivered with the description on the postcard being concealed, and a recipient removes a concealing sheet to read the description. The pressure-bonded postcard is therefore used for a confidential letter in place of a sealed letter. In the related art, in order to complete a pressure-bonded postcard that can be used as a mail, character information is printed on an inner surface of a folded postcard, a liquid adhesive or an adhesive paper is given inside the folded postcard, and then the postcard is pressure-bonded.

Japanese Laid Open Patent Application Publication No. 2005-350575 discloses a pressure-sensitive adhesive information-carrying sheet which has a substrate and a pressure-sensitive adhesive layer formed on at least one side of the substrate by curing a UV curable ink and/or an EB curable ink and in which parts of the surface of the adhesive layer are separably bonded to each other; in the pressure-sensitive adhesive information-carrying sheet, information can be recorded on the adhesive layer with toner, the bonded parts of the adhesive layer have a T-shape peel strength of 0.25 N/25 mm or less in accordance with JIS K 6854-3:1999 so that the bonded parts are peeled without breakage of the recorded information or transfer thereof to the other side, and the information recorded with the toner can be removed by being scratched with a finger or a hand.

Japanese Patent No. 4471334 discloses a ultraviolet-curable acrylic pressure-sensitive adhesive composition containing an acrylic photopolymerizable monomer and an acrylic photopolymerizable oligomer; the composition contains a liquid toner-accepting resin selected from an ethylene-acrylate resin, a polyimine resin, a polyurethane resin, and a polybutadiene resin in an amount ranging from 3 to 30 mass % relative to the whole composition (solid content) and is used to removably bond sheets to each other by being applied to the surfaces of the sheets that are to be covered, being cured to form adhesive layers, bringing the surfaces in contact with each other, and applying pressure to the surfaces.

Japanese Patent No. 4582734 discloses a pressure-sensitive adhesive printable sheet having a substrate sheet with a surface to be covered and a cured layer formed of an ultraviolet-curable pressure-sensitive adhesive; in the pressure-sensitive printable sheet, the ultraviolet-curable pressure-sensitive adhesive contains 10 to 30 parts by mass of acrylic photopolymerizable monomer having a phenyl group in its molecular structure and 20 to 50 parts by mass of an acrylic photopolymerizable oligomer in 100 parts by mass of an adhesive base containing an acrylic photopolymerizable monomer and an acrylic photopolymerizable oligomer, and the amount of the combination of the acrylic photopolymerizable monomer having a phenyl group in its structure and the acrylic photopolymerizable oligomer is 50 parts by mass or more. The ultraviolet-curable pressure-sensitive adhesive is applied to the intended part of the surface of the substrate sheet that is to be covered and then exposed to ultraviolet to form the curable layer that is not adhesive in a normal state, parts of the surface to be covered are brought into contact with each other, and the intended pressure is applied thereto to removably bond these parts of the surface to be covered to each other.

SUMMARY

Aspects of non-limiting embodiments of the present disclosure relate to an adhesive material which contains a styrene resin and a (meth)acrylate resin, which has a sea-island structure including a sea portion containing the styrene resin and the island portion containing the (meth)acrylate resin, in which the (meth)acrylate resin has a glass transition temperature that is at least 30° C. lower than that of the styrene resin, and which suppresses a reduction in an adhesive force in a high temperature and high humidity environment as compared with the case where an oxidatively polymerizable compound is not used and to a pressure-bonded print using such an adhesive material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an adhesive material containing a styrene resin, a (meth)acrylate resin, and an oxidatively polymerizable compound, wherein the adhesive material has a sea-island structure that includes a sea portion containing the styrene resin and an island portion containing the (meth)acrylate resin, and a glass transition temperature of the (meth)acrylate resin is at least 30° C. lower than a glass transition temperature of the styrene resin.

BRIEF DESCRIPTION OF THE DRAWINGS

Exemplary embodiments of the present disclosure will be described in detail based on the following figures, wherein.

DETAILED DESCRIPTION

Figure 1:
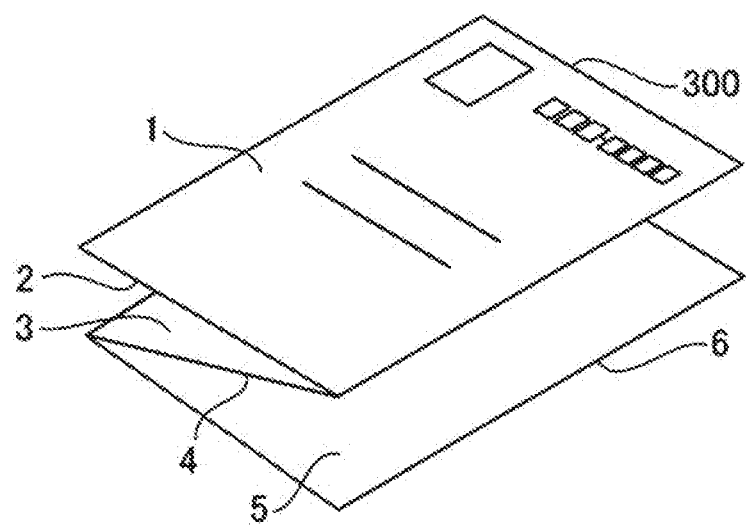
FIG. 1 schematically illustrates an example of a substrate for producing a trifold pressure-bonded postcard before the substrate is pressure-bonded.

An adhesive material according to exemplary embodiments will now be described with reference to two exemplary embodiments (first exemplary embodiment and second exemplary embodiment). The first and second exemplary embodiments are also comprehensively referred to as "exemplary embodiments".

First Exemplary Embodiment

An adhesive material according to the first exemplary embodiment contains a styrene resin, a (meth)acrylate resin, and an oxidatively polymerizable compound and has a sea-island structure including the sea portion containing the styrene resin and the island portion containing the (meth) acrylate resin; and the (meth)acrylate resin has a glass transition temperature that is at least 30° C. lower than that of the styrene resin.

The adhesive material having such characteristics according to the first exemplary embodiment is less likely to suffer a reduction in an adhesive force even in a high temperature and high humidity environment.

The mechanism thereof has been still studied but speculated as follows.

The adhesive material according to the first exemplary embodiment is suitably used in production of a pressure-bonded print by a so-called "post-pasting method" in which the adhesive material is applied after character information or other information is printed.

In a pressure-bonded postcard that is an example of the pressure-bonded print, the adhesive material is applied to the inside of the folded substrate of the pressure-bonded postcard, and parts of the folded substrate are pressure-bonded to each other.

Such an adhesive material that is given an adhesive force by being pressed is a material that exhibits plasticity by application of pressure. A known example thereof is an adhesive material that contains a styrene resin and a (meth) acrylate resin having a glass transition temperature that is at least 30° C. lower than that of the styrene resin and that has a sea-island structure including the sea portion containing the styrene resin and the island portion containing the (meth)acrylate resin.

An adhesive material of which the toner particles contain a styrene resin and a (meth)acrylate resin having a glass transition temperature that is at least 30° C. lower than that of the styrene resin, however contains a resin having a low glass transition temperature and therefore tends to suffer a reduction in a bonding strength with time. Furthermore, the (meth)acrylate resin having a low glass transition temperature is unevenly distributed in the surface layer of the adhesive material, and thus the surface of the adhesive material becomes adhesive.

Accordingly, the above-mentioned bonding strength of the adhesive material decreases with time in some cases; in particular, it is believed that the bonding strength is more likely to decrease in a high temperature and high humidity environment.

The adhesive material according to the exemplary embodiments contains an oxidatively polymerizable compound. The oxidatively polymerizable material is exposed to the surface of the adhesive material in bonding under application of pressure and contacts with oxygen in air to promote oxidative polymerization. It is believed that the cross-linked structure of the resin with the oxidatively polymerizable compound in the adhesive material is therefore formed. The formation of the cross-linked structure gives elasticity to the adhesive material, which leads to an enhancement in an adhesive force.

Hence, in the adhesive material according to the first exemplary embodiment, a reduction in an adhesive force is suppressed even in a high temperature and high humidity environment.

Second Exemplary Embodiment

An adhesive material according to the second exemplary embodiment contains a styrene resin and a (meth)acrylate resin and has a sea-island structure including the sea portion containing the styrene resin and the island portion containing the (meth)acrylate resin, the (meth)acrylate resin has a glass transition temperature that is at least 30° C. lower than that of the styrene resin, and the complex modulus of the adhesive material is from $5\times10^6$ Pa to $5\times10^8$ Pa at 60° C. when the adhesive material is pressured at 30 MPa, left to stand for 5 hours, and then analyzed with a rheometer.

The adhesive material having such characteristics according to the second exemplary embodiment is less likely to suffer a reduction in an adhesive force even in a high temperature and high humidity environment.

The mechanism thereof has been still studied but speculated as follows.

The adhesive material according to the second exemplary embodiment is suitably used in production of a pressure-bonded print (such as a pressure-bonded postcard) by "post-pasting method" as in the first exemplary embodiment.

When the adhesive material according to the second exemplary embodiment is pressured at 30 MPa, left to stand for 5 hours, and then analyzed with a rheometer, the complex modulus thereof at 60° C. is from $5\times10^6$ Pa to $5\times10^8$ Pa.

This characteristic shows that the adhesive material has an elasticity after the adhesive material is used for bonding under application of pressure in production of a pressure-bonded print (such as a pressure-bonded postcard). The adhesive force of the adhesive material is therefore higher after bonding under application of pressure than before the bonding.

Hence, an adhesive material of which a reduction in the adhesive force is suppressed even in a high temperature and high humidity environment can be produced.

The adhesive material according to the exemplary embodiments is suitably used as an adhesive material for producing a pressure-bonded print.

A typical example of a method for producing a pressure-bonded print will now be described through the following procedures 1 to 4.

1. A substrate having an image is prepared, and the adhesive material as a pressure-bonding glue is disposed on the surfaces of the image area and non-image area of the substrate by an electrophotographic process 2. The disposed adhesive material is temporarily fixed by application of pressure (the adhesive material flows and coalesces owing to the effect of the pressure to form an adhesive material layer)

3. The substrate is folded such that the side having the adhesive material layer comes inside 4. The folded substrate is pressure-bonded only by the effect of pressure with a pressure-bonding machine (the adhesive material layer flows and coalesces again owing to the effect of the pressure to pressure-bond the folded substrate)

The adhesive material according to the exemplary embodiments will now be described in detail.

The adhesive material according to the exemplary embodiments may be in the form of particles or in an indeterminate form state; in the exemplary embodiments, a particulate adhesive material will be described.

The first exemplary embodiment and the second exemplary embodiment as examples of the adhesive material according to the exemplary embodiments are comprehensively described for the sake of convenience.

The adhesive material according to the exemplary embodiments contains a styrene resin, a (meth)acrylate resin, and an oxidatively polymerizable compound and has a sea-island structure including the sea portion containing the styrene resin and the island portion containing the (meth)acrylate resin. The (meth)acrylate resin has a glass transition temperature that is at least 30° C. lower than that of the styrene resin.

The adhesive material according to the exemplary embodiments may be adhesive material particles having a single-layer structure or may be adhesive material particles having a core-shell structure with the core and the shell layer covering the core. In other words, the adhesive material may have a structure of single-layer adhesive material particles or a structure of core-shell adhesive material particles with the core and the shell layer.

In the core-shell adhesive material (adhesive material particles), the core has the above-mentioned sea-island structure. In particular, the core contains the styrene resin, the (meth)acrylate resin, and the oxidatively polymerizable compound and has a sea-island structure including a sea portion containing the styrene resin and an island portion containing the (meth)acrylate resin.

The oxidatively polymerizable compound may be contained also in the shell layer; in view of a reduction in the oxidative polymerization of the oxidatively polymerizable compound on the surface of the adhesive material (adhesive material particles), it is suitable that the oxidatively polymerizable material be not contained in the shell layer.

In the adhesive material according to the exemplary embodiments, at least one of the styrene resin, the (meth)acrylate resin, and a resin contained in the shell layer is suitably a resin having an allyl group in order to suppress a reduction in bonding strength. In other words, it is suitable that at least one of these resins have an allyl group. The resin used in the coating layer is properly a styrene resin having an allyl group.

Use of such a resin having an allyl group induces the reaction of the oxidatively polymerizable compound with the allyl group of the resin in the adhesive material, which enables an enhancement in the strength of the adhesive material and a reduction in adhesiveness. Thus, a reduction in bonding strength is likely to be suppressed.

In the case where the (meth)acrylate resin among the above-mentioned three resins is the resin having an allyl group, a reduction in bonding strength is more likely to be suppressed. In particular, using the (meth)acrylate resin as the resin having an allyl group induces the reaction of the (meth)acrylate resin unevenly distributed in the surface layer of the adhesive material with the oxidatively polymerizable compound, which leads to an enhancement in the strength of the adhesive material as well as a reduction in adhesiveness. Hence, it is suitable that the (meth)acrylate resin have an allyl group.

In order to introduce an allyl group into the above-mentioned three resins, a monomer having an allyl group is, for example, used in combination with monomers used for synthesizing the individual resins. The monomer having an ally group will be described later in detail.

The allyl group content in the resin is preferably from 1 mmol % to 20 mmol %, more preferably from 3 mmol % to 15 mmol %, and further preferably from 5 mmol % to 15 mmol % in terms of suppressing a reduction in bonding strength.

The adhesive material according to the exemplary embodiments will now be described in detail.

The adhesive material according to the exemplary embodiments has adhesive material particles. The adhesive material may contain external additives externally added to the adhesive material particles.

Core-shell adhesive material particles having a core and a shell layer will be described as the adhesive material particles; however, the adhesive material particles are not limited thereto and may be single-layer adhesive material particles.

Adhesive Material Particles

The adhesive material particles have a core that contains the styrene resin, the (meth)acrylate resin, and the oxidatively polymerizable compound and a shell layer that covers the core and that contains a resin having a glass transition temperature of 50° C. or more.

The core may contain a colorant, a release agent, and other additives in addition to the styrene resin and (meth)acrylate resin that serve as a binder resin.

Core

Sea-Island Structure

In the sea-island structure of the core, the sea portion containing the styrene resin is a continuous phase, and the island portion containing the (meth)acrylate resin is dispersed as a dispersed phase.

The sea portion may contain another component (such as another binder resin) in addition to the styrene resin. Likewise, the island portion may contain another component (such as a release agent) in addition to the (meth)acrylate resin. An island portion only containing the (meth)acrylate resin and another island portion only containing another component (such as release agent) may coexist.

The oxidatively polymerizable composition may be contained in either the sea portion or the island portion.

The smaller the longer diameter of the island portion of the sea-island structure is, the more pressure plasticity is, and the better pressure bonding property is, while the adhesive material particles are likely to be easily deformed. The larger the longer diameter of the island portion is, the less the pressure plasticity is, and the worse the pressure bonding property is, while the adhesive material particles are likely to be easily deformed. Accordingly, the longer diameter of the island portion of the sea-island structure is suitably from 200 nm to 500 nm. The longer diameter of the island portion of the sea-island structure is preferably from 200 nm to 450 nm, more preferably from 250 nm to 400 nm in terms of the pressure bonding property and a reduction in the deformation of the adhesive material.

In order to focus on the pressure bonding property, the longer diameter of the island portion may be less than 200 nm (for instance, 150 nm or less, from 5 nm to 150 nm, from 50 nm to 140 nm, or from 100 nm to 130 nm).

In order to adjust the longer diameter of the island portion of the sea-island structure to be from 200 nm to 500 nm, for instance, styrene resin particles in which multiple domains of the (meth)acrylate resin have been dispersed [namely, resin particles of which the matrix is the styrene resin and in which the multiple domains of the (meth)acrylate resin have been dispersed in the matrix] are used in production of the adhesive material by emulsion aggregation.

Observation of the sea-island structure and measurement of the longer diameter of the island portion are performed as follows.

The adhesive material is embedded into an epoxy resin and then sliced with a diamond knife, the slice is dyed with osmium tetraoxide or ruthenium tetroxide in a desiccator, and then the dyed slice is observed with a transmission electron microscope. The sea portion and island portion of the sea-island structure are distinguished from each other on the basis of color tone attributed to the degree of the dying of the resin with osmium tetraoxide, and this is utilized to see the presence of the sea-island structure. Even when a release agent is used, the color tone attributed to the degree of the dying with osmium tetraoxide can be used to distinguish the release agent. The degree of the dying is highest in the (meth)acrylate resin and lowest in the release agent, and the styrene resin is in-between.

A LUZEX image analyzer is used to select 100 island portions, and the average longer diameter is calculated as the longer diameter of the island portion.

Binder Resin

The styrene resin and the (meth) acrylate resin serve as a binder resin.

The glass transition temperature of the (meth)acrylate resin is at least 30° C. lower than that of the styrene resin. In other words, the difference in the glass transition temperature between the styrene resin and the (meth)acrylate resin is 30° C. or more, and the (meth)acrylate resin has a lower glass transition temperature than the styrene resin.

The styrene resin and the (meth)acrylate resin herein also referred to as "high-Tg styrene resin" and "low-Tg (meth) acrylate resin", respectively.

The difference in the glass transition temperature between the styrene resin and the (meth)acrylate resin is suitably 35° C. or more in terms of an enhancement in the pressure bonding property.

The glass transition temperature of the styrene resin is preferably 40° C. or more, more preferably 40° C. or more and less than 60° C., and further preferably 40° C. or more and less than 55° C. in terms of an enhancement in the pressure bonding property.

The glass transition temperature of the (meth)acrylate resin is preferably less than 10° C., more preferably −100° C. or more and less than 10° C., and further preferably −80° C. or more and less than 10° C. in terms of an enhancement in the pressure bonding property.

The glass transition temperatures of the resins can be controlled principally by adjusting the density of a rigid unit existing in the main chain of the resins, such as an aromatic ring or a cyclohexane ring. In particular, the glass transition temperature is small when the density of a soft unit existing in the main chain, such as a methylene group, an ethylene group, or an oxyethylene group, is high and high when many rigid units, such as an aromatic ring or a cyclohexane ring, exist in the main chain. In the case where the side chain, such as an aliphatic group, has a high density, the glass transition temperature tends to be small. In view of these conditions, resins having different glass transition temperatures can be produced.

The glass transition temperatures of the resins are herein determined from a DSC curve obtained by differential scanning calorimetry (DSC) and can be specifically determined in accordance with "Extrapolated Starting Temperature of Glass Transition" described in determination of glass transition temperature in JIS K 7121-1987 "Testing Methods for Transition Temperatures of Plastics".

The composition of the styrene resin will now be described.

The styrene resin is a resin produced through at least the polymerization of a styrene monomer (monomer having a styrene skeleton).

The styrene resin may be a homopolymer of the styrene monomer or may be a copolymer of the styrene monomer with another monomer.

The styrene resin and the (meth)acrylate resin may be the same type of resin (copolymer produced through polymerization of the same monomer) provided that the difference in the glass transition temperature therebetween is 30° C. or more. In particular, the styrene resin and the (meth)acrylate resin may be each a copolymer resulting from at least polymerization of a styrene monomer with (meth) acrylate.

Examples of the styrene monomer include styrene; vinylnaphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, 4-fluorostyrene, and 2,5-difluorostyrene; and nitro-substituted styrenes such as m-nitrostyrene, o-nitrostyrene, and p-nitrostyrene. Among these, styrene, p-ethylstyrene, and p-n-butylstyrene are preferred; and styrene is more preferred.

The content proportion of the styrene monomer to the whole monomer component (namely, the content proportion of the constitutional unit derived from the styrene monomer to the styrene resin) is preferably from 15 mass % to 95 mass %, and more preferably from 40 mass % to 90 mass %.

These monomers may be used alone or in combination.

The composition of the (meth)acrylate resin will now be described.

The (meth)acrylate resin is a polymer produced through at least polymerization of (meth)acrylate.

The (meth)acrylate resin may be a homopolymer of the (meth)acrylate or may be a copolymer of the (meth)acrylate with another resin.

Examples of the (meth)acrylate include alkyl (meth) acrylates, di(meth)acrylates, carboxy-substituted alkyl (meth)acrylates, hydroxy-substituted alkyl (meth)acrylates and alkoxy-substituted alkyl (meth)acrylates.

Examples of the alkyl (meth)acrylates include (meth) acrylic acid, n-methyl (meth)acrylate, n-ethyl (meth)acrylate, n-propyl (meth)acrylate, n-butyl (meth)acrylate, n-pentyl (meth)acrylate, n-hexyl (meth)acrylate, n-heptyl (meth) acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth) acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, octyl (meth) acrylate, decyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of the di(meth)acrylates include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth) acrylate, nonanediol di(meth)acrylate, and decanediol di(meth)acrylate.

An example of the carboxy-substituted alkyl (meth)acrylates is β-carboxyethyl (meth)acrylate.

Examples of the hydroxy-substituted alkyl (meth)acrylates include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the alkoxy-substituted alkyl (meth)acrylates is 2-methoxyethyl (meth)acrylate.

Among these (meth)acrylates, alkyl (meth)acrylates with an alkyl group having from 2 to 22 carbon atoms are suitable.

The content proportion of the (meth)acrylate to the whole monomer component (namely, the content proportion of the constitutional unit derived from the (meth)acrylate to the (meth)acrylate resin) is preferably from 10 mass % to 100 mass %, and more preferably from 20 mass % to 100 mass %.

Other monomers used in the styrene resin and the (meth)acrylate resin will now be described.

Examples of other monomers include ethylenically unsaturated nitriles such as acrylonitrile and methacrylonitrile; ethylenically unsaturated carboxylic acid such as acrylic acid, methacrylic acid, and crotonic acid; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

Other monomers used in the styrene resin may be the above-mentioned (meth)acrylates. Other monomers used in the (meth)acrylate resin may be the above-mentioned styrene monomers.

The styrene resin and the (meth)acrylate resin may have an acidic polar group (such as a carboxy group, a sulfonate group, or an acid anhydride); a basic polar group (such as an amino group, an amide group, or a hydrazide group); or an alcoholic hydroxyl group.

Hence, examples of other monomers also include monomers having acidic polar groups, monomers having basic polar groups, and monomers having alcoholic hydroxyl groups.

Examples of the monomers having acidic polar groups include α,β-ethylenically unsaturated compounds (such as acrylic acid, methacrylic acid, fumaric acid, maleic acid, itaconic acid, cinnamic acid, sulfonated styrene, and allyl sulfosuccinic acid).

Suitable examples of the monomers having basic polar groups include monomers having a nitrogen atom (such as (meth)acrylic amide compounds, (meth)acrylic hydrazide compounds, and aminoalkyl (meth)acrylate).

Examples of the (meth)acrylic amide compound include acrylic amide, methacrylic amide, acrylic methylamide, methacrylic methylamide, acrylic dimethylamide, acrylic diethylamide, acrylic phenylamide, and acrylic benzylamide.

Examples of the (meth)acrylic hydrazide compound include acrylic hydrazide, methacrylic hydrazide, acrylic methylhydrazide, methacrylic methylhydrazide, acrylic dimethylhydrazide, and acrylic phenylhydrazide.

Examples of the aminoalkyl (meth)acrylate include monoalkyl aminoalkyl (meth)acrylates (such as 2-aminoethyl acrylate and 2-aminoethyl methacrylate) and dialkyl aminoalkyl (meth)acrylates [such as 2-(diethylamino)ethyl (meth)acrylate].

Examples of the monomers having an alcoholic hydroxyl group include the hydroxy-substituted alkyl (meth)acrylates described as examples of the (meth)acrylate Examples of other monomers include monomers having an allyl group.

Examples of the monomers having an allyl group include allyl (meth)acrylate; N-allyl(meth)acrylamide; N,N-diallyl (meth)acrylamide; N-alkyl-N-allyl(meth)acrylamides (e.g., N-alkyl-N-allyl(meth)acrylamide with an alkyl group having from 1 to 10 carbon atoms, such as N-methyl-N-allyl (meth)acrylamide, N-ethyl-N-allyl(meth)acrylamide, and N-butyl-N-allyl(meth)acrylamide); N-phenyl-N-allyl(meth) acrylamide; and N-substituted phenyl-N-allyl(meth)acrylamide (for instance, the substituted phenyl is a phenyl group substituted with an alkyl group having from 1 to 5 carbon atoms, such as N-(2-tert-butylphenyl)-N-allyl acrylamide and N-(2,5-di-tert-butylphenyl)-N-allyl acrylamide).

Of these, a suitable monomer having an allyl group is allyl methacrylate in terms of suppressing a reduction in bonding strength.

The individual monomers may be used alone or in combination.

The amounts and properties of the styrene resin and (meth)acrylate resin will now be described.

The content proportion of the total of the styrene resin and the (meth)acrylate resin (proportion to the whole binder resin) may be, for example, 85 mass % or more and is preferably 95 mass % or more, and more preferably 100 mass %.

The mass ratio "(meth)acrylate resin/styrene resin" of the (meth)acrylate resin to the styrene resin is preferably 0.25 or more, more preferably 0.3 or more, further preferably 0.4 or more, and especially preferably 0.5 or more in terms of pressure-bonding property. This mass ratio is suitably less than 1.5 in terms of a reduction in plasticization of the adhesive material at the room temperature (for instance, 25° C.)

In the case where a styrene (meth)acrylate resin is used as the resin in the shell layer, the amount of the styrene (meth)acrylate resin refers to the total amount thereof in the core and shell layer.

The weight average molecular weight of the styrene resin is preferably from 3,000 to 50,000, and more preferably from 5,000 to 40,000 in terms of pressure-bonding property and bonding strength.

The weight average molecular weight of the (meth)acrylate resin is preferably from 3,000 to 50,000, and more preferably from 5,000 to 40,000 in terms of pressure-bonding property.

The weight average molecular weight of the resins is determined by gel permeation chromatography (GPC). The determination of the molecular weight by GPC involves using a measurement apparatus that is GPC•HLC-8120GPC manufactured by Tosoh Corporation, a column that is TSK gel Super HM-M (15 cm) manufactured by Tosoh Corporation, and a tetrahydrofuran (THF) solvent. From results of GPC, the weight average molecular weight is calculated from a molecular weight calibration curve plotted on the basis of a standard sample of monodisperse polystyrene.

Binder resins other than the styrene resin and the (meth)acrylate resin will now be described.

The styrene resin and the (meth)acrylate resin as the binder resins may be used in combination with another binder resin.

Examples of such another binder resin include vinyl resins that are homopolymers of monomers such as styrenes (such as styrene, p-chlorostyrene, and a-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene) or copolymers of two or more of these monomers.

Other examples of such another binder resin include non-vinyl resins such as epoxy resins, polyester resins, polyurethane resins, polyamide resins, cellulose resins, polyether resins, and modified rosin; mixtures thereof with the above-mentioned vinyl resins; and graft polymers obtained by polymerization of a vinyl monomer in the coexistence of such non-vinyl resins.

These binder resins may be used alone or in combination.

The amount of the binder resin is, for example, preferably from 40 mass % to 95 mass %, more preferably from 50 mass % to 90 mass %, and further preferably from 60 mass % to 85 mass % relative to the whole adhesive material particles.

Oxidatively Polymerizable Compound

The oxidatively polymerizable compound is a compound that reacts with atmospheric oxygen to induce oxidative polymerization.

The oxidatively polymerizable compound is suitably at least one selected from the group consisting of drying oil and phenol derivatives in which an aliphatic hydrocarbon group having an ethylenic double bond is bonded to a phenol.

Examples of the phenol derivatives include anacardic acid, anagigantic acid, pelandjauic acid, ginkgoic acid, ginkgolic acid, cardanol, cardol, methyl cardol, urushiol, thitsiol, renghol, and laccol.

The drying oil is containing a fatty acid having an aliphatic hydrocarbon group with an ethylenic double bond (such as palmitoleic acid, oleic acid, linoleic acid, and linolenic acid).

Examples of the drying oil include linseed oil, tung oil, safflower oil, poppy oil, perilla oil, sunflower oil, safflower oil, soybean oil, rice bran oil, cotton seed oil, and sesame oil.

These oxidatively polymerizable compounds may be used alone or in combination.

The iodine value of the oxidatively polymerizable compound is preferably 130 g/100 g or more, and more preferably 170 g/100 g or more in terms of suppressing a reduction in an adhesive force.

Examples of oxidatively polymerizable compounds with an iodine value of 130 g/100 g or more include phenol derivatives, such as cardanol and urushiol, and drying oil such as linseed oil, tung oil, safflower oil, poppy oil, perilla oil, sunflower oil, and safflower oil.

The amount of the oxidatively polymerizable compound is preferably from 5 mass % to 30 mass %, more preferably from 10 mass % to 20 mass %, and further preferably from 10 mass % to 15 mass % relative to the total amount of the styrene resin, (meth)acrylate resin, and oxidatively polymerizable compound in terms of suppressing a reduction in an adhesive force even in a high temperature and high humidity environment.

Colorant

Examples of the colorant include a variety of pigments, such as carbon black, chrome yellow, Hansa Yellow, benzidine yellow, indanthrene yellow, quinoline yellow, pigment yellow, permanent orange GTR, pyrazolone Orange, Vulcan Orange, Watchung Red, Permanent Red, Brilliant Carmine 3B, Brilliant Carmine 6B, Du Pont Oil Red, pyrazolone red, lithol red, rhodamine B lake, lake red C, pigment red, rose bengal, aniline blue, ultramarine blue, chalco oil blue, methylene blue chloride, phthalocyanine blue, pigment blue, phthalocyanine green, and malachite green oxalate, and a variety of dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or in combination.

The colorant may be optionally a surface-treated colorant or may be used in combination with a dispersant. Different types of colorants may be used in combination.

In the case where an image formed on the substrate is made to be visually recognizable after the adhesive material is disposed on the substrate, the colorant is suitably not used. In this case, the amount of the colorant is preferably less than 1 mass %, more preferably less than 0.1 mass %, and further preferably less than 0.01 mass % relative to the whole mass of the adhesive material; it is especially preferred that the colorant be not used.

In the case where part of the substrate on which the adhesive material has been disposed is made to be visually recognizable, the adhesive material suitably contains a colorant. In this case, the amount of the colorant is, for instance, preferably from 1 mass % to 30 mass %, and more preferably from 3 mass % to 15 mass % relative to the whole mass of the adhesive material.

Release Agent

Examples of a release gent include, but are not limited to, hydrocarbon waxes; natural waxes such as a carnauba wax, a rice bran wax, and a candelilla wax; synthetic or mineral/petroleum waxes such as a montan wax; and ester waxes such as a fatty acid ester and a montanic acid ester.

The melting temperature of the release agent is preferably from 50° C. to 110° C., and more preferably from 60° C. to 100° C.

The melting temperature is determined from a DSC curve obtained by differential scanning calorimetry (DSC) in accordance with "Melting Peak Temperature" described in determination of melting temperature in JIS K 7121-1987 "Testing Methods for Transition Temperatures of Plastics".

The amount of the release agent is, for example, preferably from 1 mass % to 20 mass %, and more preferably from 5 mass % to 15 mass % relative to the amount of the whole adhesive material particles.

Other Additives

Examples of other additives include known additives such as a magnetic material, a charge-controlling agent, and inorganic powder. These additives are contained in the adhesive material particles as internal additives.

Shell Layer

The shell layer is a resin layer. Specifically, the shell layer suitably contains a resin having a glass transition temperature of 50° C. or more.

The glass transition temperature of the resin used in the shell layer is preferably from 50° C. to 110° C., and more preferably from 50° C. to 90° C. in terms of a pressure-bonding property.

Examples of the resin used in the coating layer include vinyl resins that are homopolymers of monomers such as styrenes (such as styrene, p-chlorostyrene, and a-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene) or copolymers of two or more of these monomers.

Examples of known binder resins include non-vinyl resins such as epoxy resins, polyester resins, polyurethane resins, polyamide resins, cellulose resins, polyether resins, and modified rosin; mixtures thereof with the above-mentioned vinyl resins; and graft polymers obtained by polymerization of a vinyl monomer in the coexistence of such non-vinyl resins.

These binder resins may be used alone or in combination.

In particular, the resin used in the coating layer is suitably the styrene resin used in the core in terms of a pressure-bonding property.

The thickness of the shell layer is preferably from 140 nm to 550 nm, more preferably from 140 nm to 500 nm, and further preferably from 140 nm to 400 nm in terms of a pressure-bonding property.

The thickness of the shell layer is measured as follows. The adhesive material particles are embedded into an epoxy resin or another material, and a slice is cut out of it with a diamond knife or another device. The slice is analyzed with a transmission electron microscope (TEM) or another device to take images of the cross sections of the multiple adhesive material particles. The thickness of the shell layer is determined at 20 points on the images of the cross sections of the adhesive material particles, and the average thereof is defined as the thickness of the shell layer. In the case where the coating layer is hard to be observed in the images of the cross sections, the cross sections may be dyed.

Characteristics of Adhesive Material Particles

When the complex modulus of the adhesive material particles according to the exemplary embodiments is measured with a rheometer after the adhesive material particles are under application of pressure of 30 MPa and then left to stand for 5 hours, the complex modulus is from $5\times10^6$ Pa to $5\times10^8$ Pa at 60° C.

The adhesive material particles having such a characteristic can be, for example, suitably produced by using the oxidatively polymerizable compound but are not limited thereto.

The complex modulus of the adhesive material is measured with a rheometer (ARES rheometer manufactured by Rheometric Scientific Inc) and a parallel plate at a frequency of 1 Hz under heating. Specifically, a sample is set at a temperature ranging from 90° C. to 130° C. and cooled to room temperature (25° C.); and then the storage modulus, loss modulus, complex modulus, and Tan δ are measured at a temperature ranging from 30° C. to 150° C. at every temperature increase of 2° C. while the temperature is increased at 1° C./min. In the measurement of the complex modulus of the adhesive material, the upper limit of strain is 20%.

The complex modulus measured with a rheometer in such a manner is preferably from $5\times10^6$ Pa to $5\times10^8$ Pa, and more preferably from $5\times10^7$ Pa to $5\times10^8$ Pa in terms of suppressing a reduction in an adhesive force even in a high temperature and high humidity environment.

The difference in the complex modulus measured with a rheometer between before and after the adhesive material is left to stand for 5 hours is preferably from $4.9\times10^6$ Pa to $4.9\times10^8$ Pa, and more preferably from $4.5\times10^6$ Pa to $4.9\times10^8$ Pa in the above-mentioned point of view.

The volume average particle size (D50v) of the adhesive material particles is preferably from 2 μm to 10 μm, and more preferably from 4 μm to 8 μm.

The average particle size of the adhesive material particles and the index of the particle size distribution thereof are measured with COULTER MULTISIZER II (manufactured by Beckman Coulter, Inc.) and an electrolyte that is ISOTON-II (manufactured by Beckman Coulter, Inc.).

In the measurement, from 0.5 mg to 50 mg of a test sample is added to 2 ml of an aqueous solution of a 5% surfactant (suitably sodium alkylbenzene sulfonate) as a dispersant. This product is added to from 100 ml to 150 ml of the electrolyte.

The electrolyte suspended with the sample is subjected to dispersion for 1 minute with an ultrasonic disperser and then subjected to the measurement of the particle size distribution of particles having a particle size ranging from 2 μm to 60 μm using COULTER MULTISIZER II with an aperture having an aperture diameter of 100 μm. The number of sampled particles is 50,000.

Cumulative distributions by volume and by number are drawn from the smaller diameter side in particle size ranges (channels) into which the measured particle size distribution is divided. The particle size for a cumulative percentage of 16% is defined as a volume particle size D16v and a number particle size D16p, while the particle size for a cumulative percentage of 50% is defined as a volume average particle size D50v and a number average particle size D50p. Furthermore, the particle size for a cumulative percentage of 84% is defined as a volume particle size D84v and a number particle size D84p.

From these particle sizes, the index of the volume particle size distribution (GSDv) is calculated as $(D84v/D16v)^{1/2}$, while the index of the number particle size distribution (GSDp) is calculated as $(D84p/D16p)^{1/2}$.

The average circularity of the adhesive material particles is preferably from 0.94 to 1.00, and more preferably from 0.95 to 0.98.

The average circularity of the adhesive material particles is determined from (circle-equivalent circumference)/(circumference) [circumference of circle having the same projection area as image of particle]/(circumference of projection image of particle)]. In particular, the average circularity of the adhesive material particles is determined as follows.

The adhesive material particles that are to be analyzed are collected by being sucked and allowed to flow in a flat stream. An image of the particles is taken as a still image by instant emission of stroboscopic light and then analyzed with a flow particle image analyzer (FPIA-3000 manufactured by SYSMEX CORPORATION). The number of samples used to determine the average circularity is 3500.

In the case where the adhesive material contains an external additive, the adhesive material (developer) to be analyzed is dispersed in water containing a surfactant and then subjected to an ultrasonic treatment to obtain adhesive material particles having no external additive content.

The adhesive material particles (adhesive material) have plasticity to pressure even when they are not heated and have fluidity under application of pressure at a certain magnitude or more. Specifically, the adhesive material particles suitably satisfy the relationship defined by the following formula $$20° C. \leq T(1\ MPa) - T(10\ MPa) \quad \text{Formula 1:}$$

In Formula 1, T(1 MPa) represents a temperature which is measured with a flow tester and at which viscosity is $10^4$ Pa·s under application of pressure of 1 MPa, and T(10 MPa) represents a temperature which is measured with a flow tester and at which viscosity is $10^4$ Pa·s under application of pressure of 10 MPa.

The temperature difference represented by T(1 MPa)−T (10 MPa) (also referred to as "temperature difference ΔT" is preferably 20° C. or more, more preferably 40° C. or more, and further preferably 60° C. or more. At a temperature difference ΔT of 20° C. or more, the adhesive material particles have enough plasticity to pressure, which leads to an enhancement in pressure-bonding property.

The temperature difference ΔT is preferably 120° C. or less, and more preferably 100° C. or less. At a temperature difference ΔT of 120° C. or less, the adhesive material particles do not become too soft, which enables a reduction in the occurrence of dirt on a fixing member.

T(10 MPa) is preferably 140° C. or less, more preferably 130° C. or less, and further preferably 120° C. or less. At T(10 MPa) of 140° C. or less, pressure bonding may be easily performed without application of excessive pressure.

T(10 MPa) is preferably 60° C. or more, more preferably 65° C. or more, and further preferably 70° C. or more. At T(10 MPa) of 60° C. or more, adhesion to a recording medium is enhanced.

The temperature difference ΔT is measured with a flow tester. An example of the flow tester is a flow tester CFT-500 manufactured by SHIMADZU CORPORATION.

Specific measurement of the temperature difference ΔT is as follows.

The adhesive material particles (adhesive material) are compressed into a solid to prepare a sample being in the form of a pellet. The sample is placed in a flow tester, the measurement temperature is slowly increased from 50° C. within the range of 50° C. to 150° C. (rate of temperature increase: +1° C./min), and the viscosity of the sample is measured under application of a predetermined extrusion pressure. The applied pressure is fixed to be 1 MPa, and viscosity at 1 MPa for each temperature is measured. From the graph of the obtained viscosities, the temperature T(1 MPa) at which the viscosity at the applied pressure of 1 MPa is $10^4$ Pa·s is determined. T(10 MPa) is determined as in the determination of T(1 MPa) except that the applied pressure of 1 MPa is changed to 10 MPa. The temperature difference ΔT [T(1 MPa)−T(10 MPa)] is calculated from the obtained T (1 MPa) and T (10 MPa).

External Additives

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles as an external additive may be hydrophobized. The hydrophobization is performed by, for example, immersing the inorganic particles in a hydrophobizing agent. The hydrophobizing agent is not particularly limited; and examples thereof include silane coupling agents, silicone oils, titanate coupling agents, and aluminum coupling agents. These may be used alone or in combination The amount of the hydrophobizing agent is, for instance, generally from 1 part by mass to 10 parts by mass relative to 100 parts by mass of the inorganic particles.

Examples of the external additives also include resin particles [resin particles such as polystyrene particles, polymethyl methacrylate (PMMA) particles, and melamine resin particles] and cleaning aids (for instance, metal salts of higher fatty acids, such as zinc stearate, and particles of a high-molecular-weight fluorine material).

The amount of the external additive to be used is, for example, preferably from 0.01 mass % to 5 mass %, and more preferably from 0.01 mass % to 2.0 mass % relative to the amount of the adhesive material particles.

Production of Adhesive Material

Production of the adhesive material according to the exemplary embodiments will now be described.

The adhesive material according to the exemplary embodiments can be produced by preparing adhesive material particles and then externally adding an external additive to the adhesive material particles.

The adhesive material particles may be produced by any of a dry process (such as kneading pulverizing method) and a wet process (such as aggregation coalescence method, suspension polymerization method, or dissolution suspension method). Production of the adhesive material particles is not particularly limited to these production processes, and any of known techniques can be employed.

In particular, the adhesive material particles may be produced by an aggregation coalescence method.

Specifically, the adhesive material particles having the above-mentioned core-shell structure are, for example, suitably produced by an aggregation coalescence method through the following process:

a dispersion liquid of core forming resin particles in which core forming resin particles as the binder resin in the core have been dispersed is prepared (preparation of dispersion liquid of core forming resin particles);

a dispersion liquid of shell layer forming resin particles in which shell layer forming resin particles as the resin to be used in the shell layer have been dispersed is prepared (preparation of dispersion liquid of shell layer forming resin particles);

the core forming resin particles (optionally with other particles) are aggregated in the dispersion liquid of the core forming resin particles (the dispersion liquid is optionally mixed with dispersion liquids of other particles such as a colorant and a release agent) to form first aggregated particles (formation of first aggregated particles);

a dispersion liquid of the first aggregated particles in which the first aggregated particles have been dispersed is mixed with the dispersion liquid of the shell layer forming resin particles to make the shell layer forming resin particles adhere to the surfaces of the first aggregated particles to form second aggregated particles (formation of second aggregated particles); and a dispersion liquid of the second aggregated particles in which the second aggregated particles have been dispersed is heated to fuse and coalesce the second aggregated particles to form the adhesive material particles (fusion and coalescence).

In this process, the dispersion liquid of the core forming resin particles is a dispersion liquid of resin particles in which styrene resin particles inside which multiple domains of the (meth)acrylate resin have been dispersed [namely, resin particles of which the matrix is the styrene resin and in which the multiple domains of the (meth)acrylate resin have been dispersed in the matrix] have been dispersed.

In addition, the dispersion liquid of the shell layer forming resin particles is a dispersion liquid of resin particles in which resin particles having a glass transition temperature of 50° C. or more have been dispersed.

The oxidatively polymerizable compound is added to a dispersion liquid in any stage of the above-mentioned process. Since the oxidatively polymerizable compound is suitably contained in the core, the oxidatively polymerizable compound may be added to the dispersion liquid of resin particles in the preparation of the dispersion liquid of the core forming resin particles or may be added to the dispersion liquid before the aggregation in the formation of the first aggregated particles.

The process for producing the adhesive material particles by an aggregation coalescence method will now be described in detail. Production of adhesive material particles containing a colorant and a release agent will now be described; however, use of the colorant and the release agent is optional. Additives other than the colorant may be used.

Preparation of Dispersion Liquids

The dispersion liquid of the core forming resin particles, the dispersion liquid of the shell layer forming resin particles, and optionally a dispersion liquid of colorant particles and a dispersion liquid of a release agent particles are prepared.

The individual dispersion liquids of resin particles in which the individual types of resin particles have been dispersed are hereinafter referred to as "dispersion liquids of resin particles".

The dispersion liquid of the core forming resin particles is, for example, prepared as follows. Among the core forming resin (binder resin used in the core), the styrene resin particles are dispersed in a dispersion medium using a surfactant.

Examples of the dispersion medium used in the dispersion liquid of the styrene resin particles include aqueous media.

Examples of the aqueous media include water, such as distilled water and ion exchanged water, and alcohols. These aqueous media may be used alone or in combination.

Examples of the surfactant include anionic surfactants such as sulfuric acid ester salts, sulfonic acid salts, phosphoric acid esters, and soaps; cationic surfactants such as amine salts and quaternary ammonium salts; and nonionic surfactants such as polyethylene glycol, alkylphenol-ethylene oxide adducts and polyols. Among these surfactants, anionic surfactants and cationic surfactants may be used. Nonionic surfactants may be used in combination with anionic surfactants or cationic surfactants.

The surfactants may be used alone or in combination.

The styrene resin particles can be dispersed in the dispersion medium by any of known dispersion techniques; for example, general dispersers can be used, such as rotary shearing homogenizers or those having media, e.g., a ball mill, a sand mill, and a DYNO mill. The styrene resin particles may be dispersed in the dispersion medium by phase inversion emulsification. In the phase inversion emulsification, a resin to be dispersed is dissolved in a hydrophobic organic solvent in which the resin can be dissolved, a base is added to an organic continuous phase (O phase) for neutralization, and then water (W phase) is added thereto to induce phase inversion from W/O to O/W, thereby dispersing the resin in the aqueous medium in the form of particles.

Then, a monomer used for synthesizing the (meth)acrylate resin and another component, such as a polymerization initiator, are added to the dispersion liquid in which the styrene resin particles have been dispersed. The dispersion liquid is stirred. The stirring is, for example, performed for a long duration of time ranging from 1 hour to 15 hours.

Then, the styrene resin particles are impregnated with the monomer used for synthesizing the (meth)acrylate resin and a component such as a polymerization initiator. In this state, the monomer used for synthesizing the (meth)acrylate resin is polymerized.

A dispersion liquid of resin particles in which the styrene resin particles inside which the multiple domains of the (meth)acrylate resin have been dispersed [namely, resin particles of which the matrix is the styrene resin and in which the multiple domains of the (meth)acrylate resin have been dispersed in the matrix] have been dispersed is obtained in this manner. This dispersion liquid of resin particles is used as the dispersion liquid of the core forming resin particles.

The volume average particle size of the resin particles to be dispersed in the dispersion liquid of the core forming resin particles is, for example, preferably from 0.01 μm to 1 μm, more preferably from 0.08 μm to 0.8 μm, and further preferably from 0.1 μm to 0.6 μm.

The volume average particle size in the dispersion liquid of the core forming resin particles is defined as follows. Particle size distribution is measured with a laser-diffraction particle size distribution analyzer (such as LA-700 manufactured by HORIBA, Ltd.), cumulative distribution by volume is drawn from the smaller diameter side in particle size ranges (channels) into which the measured particle size distribution is divided, and the particle size having a volume of 50% relative to the whole particles is defined as the volume average particle size D50v. The volume average particles size of the particles in the other dispersion liquids is similarly determined.

The amount of the resin particles contained in the dispersion liquid of the core forming resin particles is preferably from 5 mass % to 50 mass %, and more preferably from 10 mass % to 40 mass %.

The dispersion liquid of the shell layer forming resin particles and optionally a dispersion liquid of a colorant and a dispersion liquid of release agent particles are prepared in the same manner as the preparation of the dispersion liquid of the styrene resin that is obtained in the preparation of the dispersion liquid of the core forming resin particles. The dispersion medium, the dispersion method, the volume average particle size of the particles, and the amount of the particles in the dispersion liquid of the core forming resin particles are the same as in the dispersion liquid of a colorant and the dispersion liquid of release agent particles.

Formation of First Aggregated Particles

Then, the dispersion liquid of the core forming resin particles and optionally a dispersion liquid of a colorant and a dispersion liquid of release agent particles are mixed with each other.

In the mixed dispersion liquid, the core forming resin particles, the colorant particles, and the release agent particles are hetero-aggregated to form the first aggregated particles containing the core forming resin particles, the colorant particles, and the release agent particles and having the intended particle size.

Specifically, for example, an aggregating agent is added to the mixed dispersion liquid, and the pH of the mixed dispersion liquid is adjusted to be acidic (e.g., pH from 2 to 5). Then, a dispersion stabilizer is optionally added thereto, the resulting mixture is heated to a temperature close to the glass transition temperature of the core forming resin particles (in particular, for example, −30° C. or more and −10° C. or less of the glass transition temperature of the core forming resin), and the particles dispersed in the mixed dispersion liquid are aggregated, thereby forming the first aggregated particles.

In the formation of the first aggregated particles, for instance, the aggregating agent may be added to the mixed dispersion liquid at room temperature (for instance, 25° C.) under stirring with a rotary shearing homogenizer, the pH of the mixed dispersion liquid may be adjusted to be acidic (e.g., pH from 2 to 5), a dispersion stabilizer may be optionally added thereto, and the resulting mixture may be heated.

Examples of the aggregating agent include surfactants having an opposite polarity to the surfactant used in the mixed dispersion liquid, such as inorganic metal salts and di- or higher valent metal complexes. In the case where a metal complex is used as the aggregating agent, the aggregating agent can be used in a reduced amount, and charging properties can be improved.

The aggregating agent may be used in combination with an additive that forms a complex or a similar bond with the metal ions of the aggregating agent. Such an additive is suitably a chelating agent.

Examples of the inorganic metal salts include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent may be a water-soluble chelating agent. Examples of the chelating agent include oxycarboxylic acids, such as tartaric acid, citric acid, and gluconic acid, and aminocarboxylic acid, such as iminodiacetic acid (IDA), nitrilotriacetic acid (NTA), and ethylenediaminetetraacetic acid (EDTA).

The amount of the chelating agent is, for example, preferably from 0.01 part by mass to 5.0 parts by mass, more preferably 0.1 part by mass or more and less than 3.0 parts by mass relative to 100 parts by mass of the resin particles.

Formation of Second Aggregated Particles

A dispersion liquid of the first aggregated particles in which the first aggregated particles have been dispersed is prepared, and then the dispersion liquid of the first aggregated particles is mixed with the dispersion liquid of the shell layer forming resin particles.

In the mixed dispersion liquid, hetero-aggregation is induced such that the shell layer forming resin particles adhere to the surfaces of the first aggregated particles, thereby forming the second aggregated particles having a particle size close to the particle size of the intended adhesive material particles.

Specifically, for example, when the particle size of the first aggregated particles has reached the intended particle size in the formation of the first aggregated particles, the dispersion liquid of the first aggregated particles is mixed with the dispersion liquid of the shell layer forming resin particles. Then, the mixed dispersion liquid is heated at a temperature less than or equal to the glass transition temperature of the shell layer forming resin particles, and the pH of the mixed dispersion liquid is adjusted to be, for example, approximately in the range of 6.5 to 8.5 to terminate the aggregation.

The second aggregated particles in which the shell layer forming resin particles and the release agent particles are adhering to the surfaces of the first aggregated particles are obtained in this manner.

Fusion and Coalescence

The dispersion liquid of the second aggregated particles in which the second aggregated particles have been dispersed is, for example, heated to the glass transition temperature or more of the shell layer forming resin (such as 10° C. to 50° C. higher than the glass transition temperature of the shell layer forming resin) to fuse and coalesce the second aggregated particles, thereby forming the adhesive material particles.

Through the above-mentioned process, the adhesive material particles are produced.

The process for forming the adhesive material particles may have the following additional procedure: after the dispersion liquid of the second aggregated particles in which the second aggregated particles have been dispersed is obtained, the dispersion liquid of the second aggregated particles is mixed with a dispersion liquid of resin particles in which the resin particles having a glass transition temperature of 50° C. or more have been dispersed, and the particles are aggregated such that the resin particles adhere to the surfaces of the second aggregated particles to produce third aggregated particles; and a dispersion liquid of the third aggregated particles in which the third aggregated particles have been dispersed is heated to fuse and coalesce the third aggregated particles, thereby producing the adhesive material particles.

After the fusion and coalescence, the adhesive material particles formed in the solution are washed, subjected to solid-liquid separation, and dried by known techniques to yield dried adhesive material particles.

The washing may be sufficiently carried out by displacement washing with ion exchanged water in terms of charging properties. The solid-liquid separation is not particularly limited but may be suction filtration or pressure filtration in terms of productivity. The drying is not particularly limited but may be freeze drying, flush drying, fluidized drying, or vibratory fluidized drying in terms of productivity.

An external additive is, for instance, added to the adhesive material particles being in a dried state, and the resulting adhesive material particles are mixed to produce the adhesive material according to the exemplary embodiments. The mixing may be performed, for example, with a V-blender, a HENSCHEL MIXER, or a LOEDIGE MIXER. The coarse particles of the adhesive material may be optionally removed with a vibrating sieve, air sieve, or another device.

Electrostatic Charge Image Developer

The electrostatic charge image developer used in the exemplary embodiments at least contains the adhesive material according to the exemplary embodiments.

The electrostatic charge image developer used in the exemplary embodiments may be a single component developer containing only the adhesive material according to the exemplary embodiments or may be a two-component toner that is a mixture of the adhesive material with a carrier.

The carrier is not particularly limited, and any of known carriers can be used. Examples of the carrier include coated carriers in which the surface of a core formed of magnetic powder has been coated with a coating resin, magnetic powder dispersed carriers in which magnetic powder has been dispersed in or blended with a matrix resin, and resin impregnated carriers in which porous magnetic powder has been impregnated with resin.

In the magnetic powder dispersed carriers and the resin impregnated carriers, the constituent particles may have a surface coated with a coating resin.

Examples of the magnetic powder include magnetic metals, such as iron, nickel, and cobalt, and magnetic oxides such as ferrite and magnetite.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins containing an organosiloxane bond or a modified product thereof, fluororesins, polyester, polycarbonate, phenol resins, and epoxy resins.

The coating resin and the matrix resin may contain other additives such as conductive particles.

Examples of the conductive particles include particles of metals such as gold, silver, and copper; carbon black particles; titanium oxide particles; zinc oxide particles; tin oxide particles; barium sulfate particles; aluminum borate particles; and potassium titanate particles.

An example of the preparation of the coated carrier involves coating with a coating layer forming solution in which the coating resin and optionally a variety of additives have been dissolved in a proper solvent. The solvent is not particularly limited and may be determined in view of, for instance, the type of coating resin to be used and coating suitability.

Specific examples of the coating method include a dipping method of dipping the core into the coating layer forming solution, a spray method of spraying the coating layer forming solution onto the surface of the core, a fluid-bed method of spraying the coating layer forming solution to the core that is in a state of being floated by the flowing air, and a kneader coating method of mixing the core of the carrier with the coating layer forming solution in the kneader coater and removing a solvent.

The mixing ratio (mass ratio) of the adhesive material to the carrier in the two-component developer (adhesive material:carrier) is preferably from 1:100 to 30:100, and more preferably from 3:100 to 20:100.

Sheet for Producing Pressure-Bonded Print

A sheet for producing a pressure-bonded print according to the exemplary embodiments include a substrate and the adhesive material according to the exemplary embodiments disposed on the substrate.

The substrate is folded such that the adhesive material disposed on the substrate comes inside the folded substrate, and then the sheet for producing the pressure-bonded print according to the exemplary embodiments is pressure-bonded to produce a pressure-bonded print; alternatively, the substrate is attached to another substrate such that the adhesive material disposed on the substrate is interposed between these substrates, and then the sheet for producing the pressure-bonded print is pressure-bonded to produce a pressure-bonded print.

Substrate

The substrate is not particularly limited, and a paper substrate (e.g., sheet) or a sheet-like member formed of a material having a relatively high flexibility, such as a recording medium formed of a plastic film (e.g., OHP sheet), is used; however, a planar member formed of a material having a relatively high rigidity (such as a thick plastic card) may be used.

Examples of the paper substrate include wood free paper, coated paper, kraft paper, glassine paper, and recycled paper.

An image may be formed on the substrate.

The formation of an image is not particularly limited; and an image may be formed by, for example, an electrophotographic process, printing with a printing plate, or ink jet printing.

When the adhesive material according to exemplary embodiments is used, the substrate does not need to be single-purpose paper to which a glue has been preliminarily applied and may be plain paper or a particular substrate. In particular, since the adhesive material according to the exemplary embodiments enables a reduction in the degree of heating the substrate in a bonding procedure or pressure bonding by application of pressure without heating, the adhesive material can be used for resin films having an insufficient heat resistance.

Adhesive Material and Adhesive Material Layer

The adhesive material used in the sheet for producing a pressure-bonded print according to exemplary embodiments may be disposed in a state in which the shape of the particles remains; however, it is suitable that the adhesive material be disposed in the form of an adhesive material layer.

The adhesive material layer is formed by compressing the adhesive material particles disposed on the substrate of the sheet for producing a pressure-bonded print according to the exemplary embodiments. This compression is carried out by temporary bonding that will be described later.

In the case where the adhesive material in the form of the adhesive material particles is disposed on the sheet for producing a pressure-bonded print according to the exemplary embodiments, a single layer or two layers of the adhesive material particles are suitably disposed.

In the case where the adhesive material being in the form of particles is disposed on the substrate, the total amount of the adhesive material on the substrate is preferably from 0.5 g/m$^2$ to 50 g/m$^2$, more preferably from 1 g/m$^2$ to 40 g/m$^2$, and further preferably from 1.5 g/m$^2$ to 30 g/m$^2$.

When the amount of the adhesive material on the substrate is from 0.5 g/m$^2$ to 50 g/m$^2$, the sheet for producing a pressure-bonded print enables production of a pressure-bonded print having a proper peel force.

The adhesive material layer may be a continuous layer or may be a discontinuous layer.

The thickness of the adhesive material layer is preferably from 0.2 μm to 25 μm, more preferably from 0.4 μm to 20 μm, and further preferably from 0.6 μm to 15 μm.

The sheet for producing the pressure-bonded print according to the exemplary embodiments may have the adhesive material disposed on the entire surface of the substrate; however, the adhesive material may be disposed on at least part of the substrate. In the case where the substrate has an image, the sheet for producing the pressure-bonded print according to the exemplary embodiments may have the adhesive material on either the image area or non-image area of the substrate. The adhesive material may be, for instance, disposed in the form of a solid image on at least part of the non-image area, may be disposed in the form of halftone dots on at least part of the image area, or may be disposed in the form of a solid image on at least part of the image area.

In the case where the adhesive material is disposed on the image area of the substrate, the adhesive material is suitably transparent. In the case where such an adhesive material is in the form of the adhesive material layer, the adhesive material layer is suitably transparent. In this case, the image area is well visible.

The expression "the adhesive material or the adhesive material layer is transparent" refers to that the adhesive material or the adhesive material layer has an average light transmittance of 10% or more for light being in a visible range (from 400 nm to 700 nm); and the average light transmittance is preferably 50% or more, more preferably 80% or more, and further preferably 90% or more. The average light transmittance is measured with a spectrophotometer V700 (manufactured by JASCO Corporation).

Such an average light transmittance can be, for example, given by adjusting the amount of the colorant in the adhesive material or the amount of the adhesive material that is to be disposed.

Method and Apparatus for Producing Sheet for Producing Pressure-Bonded Print

An apparatus for producing the sheet for producing a pressure-bonded print according to the exemplary embodiments includes a disposing unit that contains the adhesive material according to the exemplary embodiments and that disposes the adhesive material on the substrate.

An apparatus for producing the sheet for producing a pressure-bonded print according to the exemplary embodiments suitably includes a temporary fixing unit that temporarily fixes the adhesive material disposed on the substrate.

A method for producing the sheet for producing a pressure-bonded print according to the exemplary embodiments includes disposing the adhesive material according to the exemplary embodiments on the substrate.

A method for producing the sheet for producing a pressure-bonded print according to the exemplary embodiments suitably includes temporarily fixing the adhesive material disposed on the substrate.

Process and Unit for Disposing Adhesive Material

The adhesive material may be disposed on the substrate in any manner with any unit and can be disposed by any of known techniques with any of known units. The adhesive material according to the exemplary embodiments may be, for example, disposed by the following technique with the following unit: an application method and unit that involve preparing a dispersion liquid of the adhesive material in which at least the adhesive material has been dispersed, applying the dispersion liquid of the adhesive material onto the substrate, and drying the applied dispersion liquid and a method and unit that involve forming a layer of melted powder of the adhesive material onto a peelable substrate and laminating the formed layer on the substrate.

The adhesive material according to the exemplary embodiment is suitably disposed on the substrate by an electrophotographic method with an electrophotographic unit in terms of easy determination of the position at which the adhesive material is to be disposed on the substrate.

Application Method and Application Unit

Examples of the application method for applying the dispersion liquid of the adhesive material onto the substrate include on-machine and off-machine coating with a blade coater, a roll coater, a reverse roll coater, an air knife coater, a rod coater, a cast coater, a bar coater, a curtain coater, a slit die coater, or a gravure coater. The adhesive material may be dried by air drying or artificial drying; examples of a drier include an infrared dryer, a drum dryer, an air cap dryer, an air foil dryer, and an air conveyor dryer.

The dispersion liquid of the adhesive material can be prepared by any technique; for instance, it can be prepared by synthesizing a resin in an aqueous solvent through emulsion polymerization using any of known surfactants. The prepared dispersion liquid of the adhesive material may be mixed with another dispersion liquid of resin particles to produce a dispersion liquid of the adhesive material in which a different type of resin particles has been dispersed.

Electrophotographic Method and Unit for Disposing Adhesive Material on Substrate Examples of the electrophotographic method for disposing the adhesive material on the substrate include a method that involves entirely or partially developing an image that has been formed on the surface of the substrate with a roller or another device in a bias electric field and then disposing the adhesive material and a method that involves disposing the adhesive material at a predetermined position in the same manner as an electrophotographic toner.

Method Involving Entirely or Partially Developing Image Formed on Surface of Substrate in Bias Electric Field and Disposing Adhesive Material An example of the method that involves entirely or partially developing an image that has been formed on the surface of the substrate in a bias electric field and then disposing the adhesive material is a method that involves use of a transport unit that transports an electrostatic charge image developer containing the adhesive material according to the exemplary embodiments, a support unit that faces the transport unit and that can support the substrate, and a bias applying unit that applies a bias between the transport unit and the support unit.

In particular, for instance, such a method is a magnetic brush method that involves use of a magnetic roller that transports an electrostatic charge image developer containing the adhesive material according to the exemplary embodiments, a flat plate that faces the magnetic roller and that can support the substrate, and a bias applying unit that applies a bias between the magnetic roller and the flat plate.

The transport unit, the support unit, and the bias applying unit are not particularly limited; and units known in the field of toner used for developing an electrostatic charge image can be used.

Method Involving Disposing Adhesive Material at Predetermined Position in Same Manner as Electrophotographic Toner The method that involves disposing the adhesive material at a predetermined position in the same manner as an electrophotographic toner is suitably the following image forming method. Such an image forming method involves use of the following image forming apparatus. In the exemplary embodiments, the adhesive material disposed in a pattern is referred to as "image" for the sake of convenience.

Image Forming Method and Image Forming Apparatus

The image forming apparatus used in the exemplary embodiments includes an image holding member, a charging unit that charges the surface of the image holding member, an electrostatic charge image forming unit that forms an electrostatic charge image on the charged surface of the image holding member, a developing unit that has an electrostatic charge image developer containing the adhesive material according to the exemplary embodiments and that develops the electrostatic charge image on the surface of the image holding member with the electrostatic charge image developer to form a toner image, and a transfer unit that transfers the toner image formed on the surface of the image holding member to the surface of the substrate.

The image forming method used in the exemplary embodiments includes charging the surface of the image holding member, forming an electrostatic charge image on the charged surface of the image holding member, developing the electrostatic charge image on the surface of the image holding member with an electrostatic charge image developer containing the adhesive material according to the exemplary embodiments to form a toner image, and transferring the toner image formed on the surface of the image holding member to the surface of a substrate.

The above-mentioned processes and units may be known processes and units employed in typical image forming methods and image forming units. In the case where an intermediate transfer body or another member is further used in the exemplary embodiments, the toner image formed on the surface of the image holding member is temporarily transferred to the intermediate transfer body and eventually transferred to the substrate.

Moreover, the image forming apparatus and the image forming method may include additional unit and process, such as a cleaning unit for cleaning the surface of the image holding member and a cleaning process.

In the case where an electrophotographic photoreceptor is used as the image holding member, an image may be, for example, formed as follows. The surface of the electrophotographic photoreceptor is charged with a corotron charger, contact-type charger, or another device and then exposed to light to form an electrostatic charge image. Then, the surface of the electrophotographic photoreceptor is brought into contact with or brought closer to a development roller having the layer of a developer on its surface to attach the toner particles to the electrostatic charge image, so that a toner image is formed on the electrophotographic photoreceptor. The formed toner image is transferred to the surface of the substrate, such as paper, with a corotron charger or another device to dispose the adhesive material on the substrate.

The electrophotographic photoreceptor is generally an inorganic photoreceptor formed of amorphous silicon or selenium or an organic photoreceptor in which polysilane or phthalocyanine is used as a charge generating material or a charge transporting material; in particular, a photoreceptor formed of amorphous silicon is suitable because it has a long lifetime.

Process and Unit for Temporarily Fixing Adhesive Material

The adhesive material disposed on the substrate with the above-mentioned disposing unit through the above-mentioned disposing process is temporarily fixed to form the adhesive material layer on the substrate.

Owing to the temporal fixing of the adhesive material disposed on the substrate, the adhesive material according to the exemplary embodiments is less likely to move or drop out from the position at which the adhesive material has been disposed on the substrate.

It is suitable that the adhesive material be temporarily fixed by application of pressure. The maximum of the pressure applied in the temporary fixing (also referred to as "temporary fixing pressure") is preferably from 3 MPa to 100 MPa, more preferably from 5 MPa to 80 MPa, and further preferably from 10 MPa to 70 MPa. A temporary fixing pressure of 3 MPa or more is suitable because it enables production of sufficient temporary fixability. A temporary fixing pressure of 100 MPa or less is suitable because it enables reductions in the occurrence of stained image, contamination of a pressing unit, and curling of the substrate due to the occurrence of offset and in deformation of the substrate (also referred to curled substrate) after the temporary fixing.

Since the maximum of the temporary fixing pressure in the temporary fixing is 3 MPa or more, the sheet for producing a pressure-bonded print enables production of a pressure-bonded print of which an image formed on the substrate has an excellent gloss.

Since the maximum of the temporary fixing pressure in the temporary fixing is 100 MPa or less, the sheet for producing a pressure-bonded print enables production of a pressure-bonded print being excellent in an adhesive force and having a substrate with a large peel force.

Method and Unit for Applying Pressure

Pressure can be applied by any method with any unit, and any of known techniques for applying pressure can be used, such as a method involving use of known devices for fixing toner; for example, pressure can be applied with a fixing roller.

Examples of the pressure fixing roller include fixing rollers having a cylindrical metal core coated with a fluorine resin [for instance, TEFLON (registered trademark)], a silicone resin, or perfluoroalkylate. In addition, a fixing roller made of stainless use steel (SUS) may be used to gain high fixing pressure. In the temporary fixing, the substrate is generally allowed to pass through two rollers; the two rollers may be made of the same material or different materials. Examples of a combination of the materials include SUS and SUS, SUS and a silicon resin, SUS and a tetrafluoroethylene-perfluoroalkyl vinyl ether copolymer (PFA), and PFA and PFA.

In the exemplary embodiments, the pressure distribution of, for example, the fixing roller can be measured with a commercially available pressure-distribution-measuring sensor; for instance, it can be specifically measured with a pressure measurement film PRESCALE manufactured by FUJIFILM Corporation. In the exemplary embodiments, the maximum of the temporary fixing pressure in the temporary fixing refers to the maximum degree of a change in pressure from the input of a fixing nip to the output in the direction in which the substrate passes.

In the exemplary embodiments, the temporary fixing is suitably performed without heating. The term "temporary fixing without heating" herein refers to that a unit which directly heats the temporary fixing unit is not provided. Hence, an increase in the internal temperature of an apparatus to environmental temperature or higher due to, for instance, heat generated by another energy source is not eliminated.

The temporary fixing temperature is preferably from 15° C. to 50° C., more preferably from 15° C. to 45° C., and further preferably from 15° C. to 40° C.

The temporary fixing temperature within such a range gives good temporary fixability.

In the case where the disposing process is carried out by the above-mentioned image forming method, a method for producing the sheet for producing the pressure-bonded print according to the exemplary embodiments suitably includes charging the surface of the image holding member, forming an electrostatic charge image on the charged surface of the image holding member, developing the electrostatic charge image on the surface of the image holding member with an electrostatic charge image developer containing the adhesive material according to the exemplary embodiments to form a toner image, transferring the toner image formed on the surface of the image holding member to the surface of the substrate, and temporarily fixing the toner image on the surface of the substrate by application of pressure.

In the case where such an image forming method involves use of the above-mentioned image forming apparatus, an apparatus for producing the sheet for producing the pressure-bonded print according to the exemplary embodiments suitably includes an image holding member, a charging unit that charges the surface of the image holding member, an electrostatic charge image forming unit that forms an electrostatic charge image on the charged surface of the image holding member, a developing unit that has an electrostatic charge image developer containing the adhesive material according to the exemplary embodiments and that develops the electrostatic charge image on the surface of the image holding member with the electrostatic charge image developer to form a toner image, a transfer unit that transfers the toner image formed on the surface of the image holding member to the surface of the substrate, and a temporarily fixing unit that temporarily fixes the toner image on the surface of the substrate by application of pressure.

These individual processes and units are the same as the processes and units in the above-mentioned disposing process and disposing unit and the above-mentioned temporary fixing process and temporary fixing unit, and suitable examples thereof are also the same.

Pressure-Bonded Print

A first example of the pressure-bonded print according to the exemplary embodiments includes a folded substrate and the adhesive material according to the exemplary embodiments disposed on the inner surface of the folded substrate.

A second example of the pressure-bonded print according to the exemplary embodiments includes two substrates and the adhesive material according to the exemplary embodiments disposed between the two substrates.

The inside of the folded substrate in the first example and the two substrates in the second example are suitably glued with the adhesive material according to the exemplary embodiments.

In the exemplary embodiments, the expression "the inside of the folded substrate and the two substrates are glued" refers to that the glued substrate has a peel force of 0.1 N or more. The peel force is preferably 0.2 N or more, and more preferably 0.3 N or more in order to prevent unexpected peeling. The peel force is measured in accordance with a 90° peeling test method described in JIS Z 0237:2009.

The pressure-bonded print according to the exemplary embodiments is suitably peelable. In the exemplary embodiments, the expression "the pressure-bonded print is peelable" refers to that the folded and glued substrate and two substrates glued to each other can be peeled.

In particular, in the pressure-bonded print according to the exemplary embodiments, the glued substrate preferably has a peel force of 5 N or less, more preferably 3 N or less, and further preferably 2 N or less.

At a peel force of 5 N or less, the peeling is easy, and breakage of the substrate due to insufficient strength thereof is less likely to occur in the peeling; even when an image is formed on the surface of the substrate that is to be glued, the image is less likely to be damaged.

Even in the case where the pressure-bonded print according to the exemplary embodiments is peeled, the peeled pressure-bonded print can be glued again by being pressure-bonded again. In other words, even after the pressure-bonded print is peeled, it can be reused as the pressure-bonded print by being pressure-bonded again.

In the first example of the pressure-bonded print according to the exemplary embodiments, the adhesive material may be disposed on at least part of the inner surface of the folded substrate.

In the second example of the pressure-bonded print according to the exemplary embodiments, the adhesive material may be at least partially disposed between the two substrates.

In the case where an image is formed on the substrate in the first and second examples, the adhesive material according to the exemplary embodiments may be disposed on either the non-image area or image area of the substrate. The adhesive material may be, for example, disposed in the form of a solid image on at least part of the non-image area, disposed in the form of halftone dots on at least part of the image area, or disposed in the form of a solid image on at least part of the image area.

In the pressure-bonded print according to the exemplary embodiments, the adhesive material according to the exemplary embodiments is suitably disposed in the form of the adhesive material layer on the inner surface of the folded substrate or between the substrate and another substrate.

The adhesive material layer is formed by compressing the adhesive material particles existing on the substrate.

The adhesive material layer may be a continuous layer or a discontinuous layer.

The thickness of the adhesive material layer is preferably from 0.2 μm to 25 μm, more preferably from 0.4 μm to 20 μm, and further preferably from 0.6 μm to 15 μm.

In the case where the adhesive material exists on the image area of the substrate after the pressure-bonded print according to the exemplary embodiments is peeled, the adhesive material is suitably transparent. Furthermore, in the case where the adhesive material is in the form of the adhesive material layer, the adhesive material layer is suitably transparent. The transparent adhesive material and adhesive material layer give good visibility to the image area.

In the pressure-bonded print according to the exemplary embodiments, the expression "the adhesive material or the adhesive material layer is transparent" has the same meaning as the expression "the adhesive material or the adhesive material layer is transparent" in the sheet for producing the pressure-bonded print according to the exemplary embodiments, and suitable examples thereof are also the same.

The transparent adhesive material and adhesive material layer can be given, for instance, by appropriately adjusting the amount of the colorant used in the adhesive material and the amount of the adhesive material that is to be disposed.

In the first example of the pressure-bonded print according to the exemplary embodiments, the adhesive material according to the exemplary embodiments may be disposed at multiple positions on the inner surface of the folded substrate.

In the second example of the pressure-bonded print according to the exemplary embodiments, three or more substrates may be used, and the adhesive material according to the exemplary embodiments may be disposed at multiple positions between two substrates.

The pressure-bonded print according to the exemplary embodiments may be a combination of the first and second examples thereof. In particular, one pressure-bonded print may have both part in which the adhesive material is disposed on the inner surface of a folded substrate and another part in which the adhesive material is disposed between two substrates.

Substrate

The substrate used in the pressure-bonded print according to the exemplary embodiments has the same meaning as the substrate used in the sheet for producing the pressure-bonded print according to the exemplary embodiments, and suitable examples thereof are also the same.

Method and Apparatus for Producing Pressure-Bonded Print

First Example

A first example of an apparatus for producing the pressure-bonded print according to the exemplary embodiments suitably includes a disposing unit that has the adhesive material according to the exemplary embodiments and that disposes the adhesive material on the substrate and a fixing unit that folds and pressure-bonds the substrate or that superimposes the substrate on another substrate and pressure-bonds the substrates to each other.

A first example of a method for producing the pressure-bonded print according to the exemplary embodiments suitably includes disposing the adhesive material according to the exemplary embodiments on the substrate and folding and pressure-bonding the substrate or superimposing the substrate on another substrate and then pressure-bonding the substrates to each other.

Disposing Process and Disposing Unit

The disposing process and the disposing unit are the same as the disposing process and disposing unit in the method for producing the sheet for producing the pressure-bonded print, and suitable examples thereof are also the same.

Pressure-Bonding Process and Pressure-Bonding Unit

The pressure-bonded print according to the exemplary embodiments is produced by pressure-bonding the folded substrate or by pressure-bonding the substrate to another substrate in the pressure-bonding process with the pressure-bonding unit.

In the example in which the substrate is folded and pressure-bonded, the adhesive material exists on the inner surface of the folded substrate. In the example in which the substrate is superimposed on another substrate and pressure-bonded thereto, the adhesive material exists between the substrate and such another substrate.

In the pressure-bonding process, the two sides of the inner surface of the folded substrate or the surface of the substrate and the surface of another substrate are suitably glued to each other with the adhesive material.

The pressure-bonding process suitably enables production of the pressure-bonded print according to the exemplary embodiments in which the adhesive material according to the exemplary embodiments is disposed in the form of the adhesive material layer on the inner surface of the folded substrate or between the substrate and another substrate.

The substrate may be folded in any manner and can be folded by any of known techniques.

The substrate is suitably folded such that the two regions on the surface of the substrate face each other and that the adhesive material according to the exemplary embodiments exists on at least one of the two regions. The adhesive material may exist on at least part of the facing two regions.

Multiple parts of one substrate may be folded, and the adhesive material may be disposed at multiple positions between the facing two regions of such a substrate.

The substrate having the adhesive material may be superimposed on another substrate in any manner and can be superimposed by any of known techniques.

The substrates are suitably superimposed on each other such that one side of the substrate faces one side of another substrate and that the adhesive material according to the exemplary embodiments exist on at least one of these two sides. The adhesive material may exist on at least part of the facing two sides.

The number of the substrates that are to be pressure-bonded is not particularly limited, and different substrates may be glued to multiple parts of one substrate.

Moreover, an additional substrate may be glued to another substrate glued to the substrate. In such a case, the adhesive material suitably exists also between another substrate and the additional substrate.

In the pressure-bonding process, the example in which the substrate is folded and pressure-bonded may be in combination with the example in which the substrate is superimposed on another substrate and pressure-bonded thereto.

The pressure-bonding process is suitably carried out by application of pressure. The maximum of the pressure applied in the pressure-bonding process (also referred to as "bonding pressure") is preferably from 3 MPa to 200 MPa, more preferably from 5 MPa to 160 MPa, and further preferably from 10 MPa to 140 MPa. A bonding pressure of 3 MPa or more is suitable because it enables production of a pressure-bonded print having a sufficient adhesive force and being less likely to suffer unexpected peeling. A bonding pressure of 200 MPa or less is suitable because it enables reductions in the occurrence of stained image, contamination of a fixing roller, and curling of the substrate due to the occurrence of offset and in the occurrence of a problem, such as deformation of the substrate (also referred to curled substrate) after the pressure-bonding.

Method and Device for Applying Pressure

Pressure can be applied by any method with any unit, and any of known techniques for applying pressure can be used, such as a method involving use of known fixing devices; for example, pressure can be applied with a pressure-bonding roller.

Examples of the pressure-bonding roller include pressure-bonding rollers having a cylindrical metal core coated with a fluorine resin [for instance, TEFLON (registered trademark)], a silicone resin, or perfluoroalkylate. In addition, a pressure-bonding roller made of SUS may be used to gain high fixing pressure. In pressure bonding, the substrate is generally allowed to pass through two rollers; the two rollers may be made of the same material or different materials. Examples of a combination of the materials include SUS and SUS, SUS and a silicon resin, SUS and PFA, and PFA and PFA.

In the exemplary embodiments, the pressure distribution of, for example, the pressure-bonding roller can be measured with a commercially available pressure-distribution-measuring sensor; for instance, it can be specifically measured with a pressure measurement film PRESCALE manufactured by FUJIFILM Corporation. In the exemplary embodiments, the maximum of the bonding pressure refers to the maximum degree of a change in pressure from the input of a fixing nip to the output in the direction in which the substrate passes.

In the exemplary embodiments, the pressure bonding is suitably performed without heating. The term "pressure bonding without heating" herein refers to that a unit which directly heats a pressure-bonding unit is not provided. Hence, an increase in the internal temperature of an apparatus to environmental temperature or higher due to, for instance, heat generated by another energy source is not eliminated.

The pressure-bonding temperature is preferably from 15° C. to 50° C., more preferably from 15° C. to 45° C., and further preferably from 15° C. to 40° C.

The pressure-bonding temperature within such a range gives good fixability.

Process and Unit for Temporarily Fixing Adhesive Material

The method for producing the pressure-bonded print according to the exemplary embodiments may include a temporary fixing process performed after the transfer process and before the pressure-bonding process.

Owing to the temporal fixing of the adhesive material disposed on the substrate, the adhesive material according to the exemplary embodiments is less likely to move or drop out from the position at which the adhesive material has been disposed on the substrate.

The apparatus for producing the pressure-bonded print according to the exemplary embodiments may include a temporary fixing unit.

The temporary fixing process and the temporary fixing unit are the same as the temporary fixing process and the temporary fixing unit in the method and apparatus for producing the sheet for producing the pressure-bonded print, and suitable examples are also the same.

In the case where the disposing process is carried out by the above-mentioned image forming method, the method for producing the pressure-bonded print according to the exemplary embodiments suitably includes charging the surface of the image holding member, forming an electrostatic charge image on the charged surface of the image holding member, developing the electrostatic charge image on the surface of the image holding member with an electrostatic charge image developer containing the adhesive material according to the exemplary embodiments to form a toner image, transferring the toner image formed on the surface of the image holding member to the surface of the substrate, and folding and pressure-bonding the substrate or superimposing the substrate on another substrate and then pressure-bonding the substrates.

The method for producing the pressure-bonded print may include the above-mentioned temporary fixing process performed after the transfer process and before the pressure-bonding process.

In the case where such an image forming method involves use of the above-mentioned image forming apparatus, an apparatus for producing the pressure-bonded print according to the exemplary embodiments suitably includes an image holding member, a charging unit that charges the surface of the image holding member, an electrostatic charge image forming unit that forms an electrostatic charge image on the charged surface of the image holding member, a developing unit that contains an electrostatic charge image developer containing the adhesive material according to the exemplary embodiments and that develops the electrostatic charge image on the surface of the image holding member with the electrostatic charge image developer to form a toner image, a transfer unit that transfers the toner image formed on the surface of the image holding member to the surface of the substrate, and a pressure-bonding unit that folds and pressure-bonds the substrate or that superimposes the substrate on another substrate and then pressure-bonds the substrates.

The apparatus for producing the pressure-bonded print may have the above-mentioned temporary fixing unit.

These individual processes and units are the same as the processes and units in the above-mentioned disposing process and disposing unit, the above-mentioned fixing process and fixing unit, and the above-mentioned temporary fixing process and temporary fixing unit; and suitable examples thereof are also the same.

Second Example

The second example of the method for producing the pressure-bonded print according to the exemplary embodiments may include folding and pressure-bonding the sheet for producing the pressure-bonded print according to the exemplary embodiments or superimposing the sheet for producing the pressure-bonded print according to the exemplary embodiments on another substrate or another sheet for producing the pressure-bonded print according to the exemplary embodiments and then pressure-bonding the sheet thereto.

This pressure-bonding process is the same as the pressure-bonding process in the first example of the method for producing the pressure-bonded print according to the exemplary embodiments, and the suitable examples are also the same.

Pressure-Bonded Postcard

A pressure-bonded postcard will now be described as an example of the pressure-bonded print according to the exemplary embodiments.

FIG. 1 schematically illustrates an example of a substrate for producing a trifold pressure-bonded postcard before being pressure-bonded.

With reference to FIG. 1, a substrate 300 for producing trifold pressure-bonded postcard has an address side 1; print sides 2, 3, 4, and 5; and a back side 6. The print sides 2 and 3 and the print sides 4 and 5 are individually pressure-bonded to each other to form a postcard, and this postcard is used as a pressure-bonded postcard.

An example of the pressure-bonded print according to the exemplary embodiments can be produced by disposing the adhesive material according to the exemplary embodiments on at least one selected from the group consisting of the print sides 2 and 3 of the substrate for producing a pressure-bonded postcard and on at least one selected from the group consisting of the print sides 4 and 5 thereof and then pressure-bonding these print sides.

The adhesive material according to the exemplary embodiments may exist on at least part of the individual print sides; in particular, in the case where the adhesive material according to the exemplary embodiments is in the form of toner, the position on which the adhesive material is to be disposed is easily determined on the basis of the strength of the substrate and the intended use of the pressure-bonded postcard.

Apparatus for Producing Pressure-Bonded Print

Figure 2:
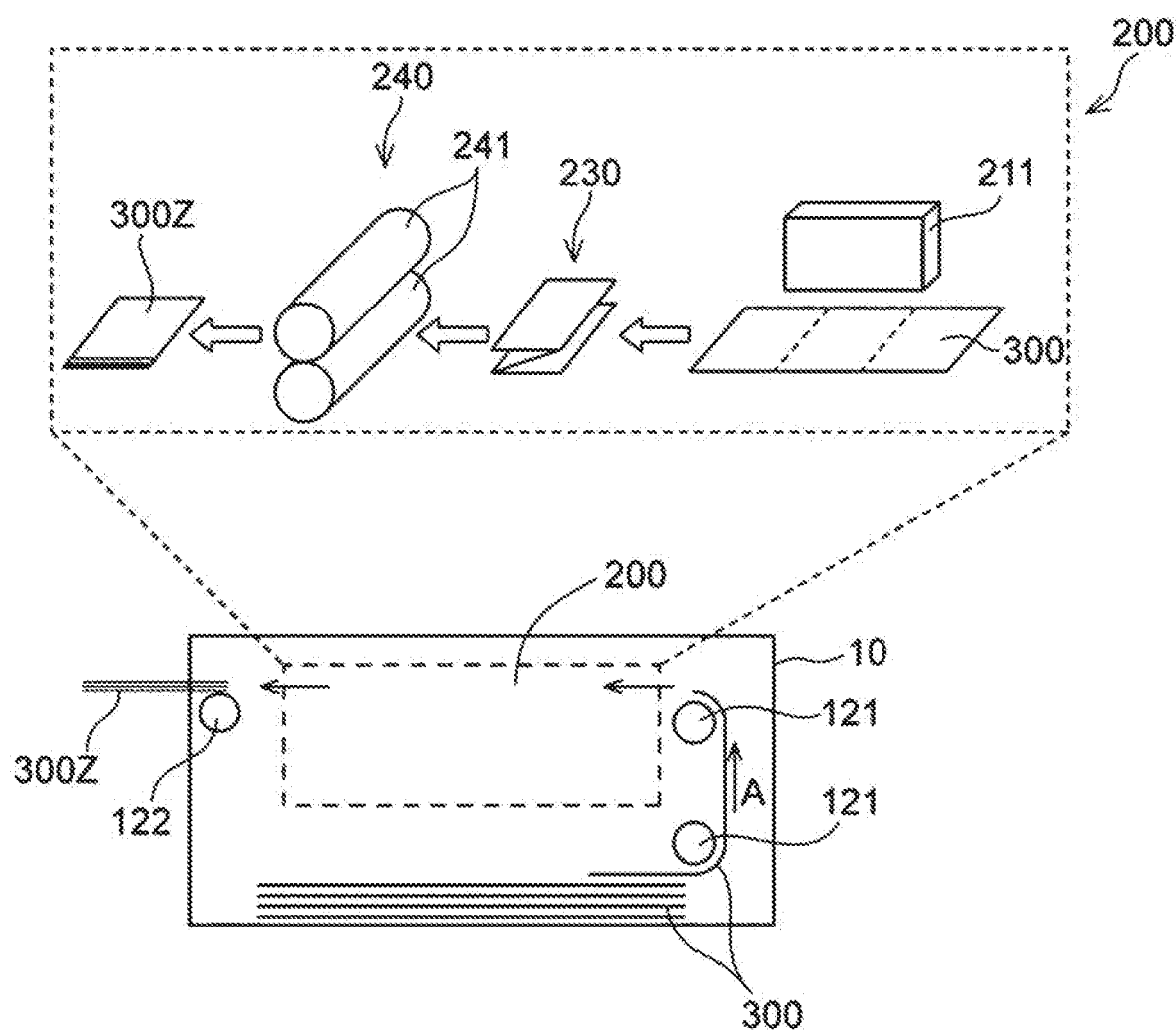
FIG. 2 schematically illustrates an example of an apparatus for producing a pressure-bonded print according to exemplary embodiments.

FIG. 2 schematically illustrates an example of the apparatus for producing the pressure-bonded print according to the exemplary embodiments.

An apparatus 10 for producing the pressure-bonded print contains the substrate 300 for producing a trifold pressure-bonded postcard, and the substrate 300 is carried by supplying rollers 121 in the direction indicated by the arrow A and transported to a pressure-bonded print processor 200.

The pressure-bonded print processor 200 used in the exemplary embodiments includes an adhesive material disposing device 211, a folding mechanism 230, and a pressure-bonding mechanism 240.

The adhesive material disposing device 211 may be, for example, a device having a unit for applying a dispersion liquid of the adhesive material, in which the adhesive material according to the exemplary embodiments has been dispersed, onto the substrate or a device having a unit for electrophotographically disposing the adhesive material according to the exemplary embodiments onto the substrate.

The folding mechanism 230 folds the substrate 300 having the adhesive material in three.

The pressure-bonding mechanism 240 has pressure-bonding rollers 241 and nips the substrate 300 folded between the pressure-bonding rollers 241 for pressure-bonding to produce a trifold pressure-bonded postcard 300Z.

The produced pressure-bonded postcard 300Z is transported by a transport roller 122 and ejected to the outside of the apparatus.

Image Forming Apparatus

Figure 3:
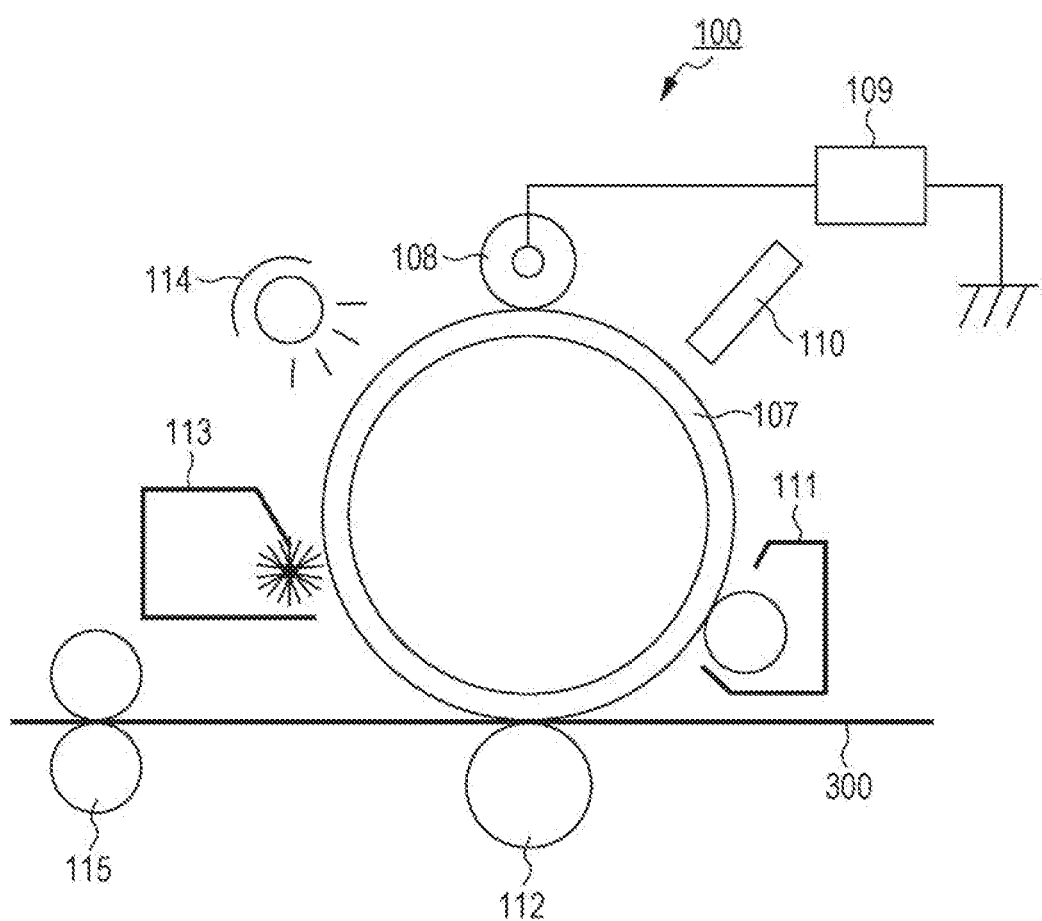
FIG. 3 schematically illustrates an example of an image forming apparatus used as an adhesive material disposing device shown in FIG. 2.

FIG. 3 schematically illustrates an example of an image forming apparatus used as the adhesive material disposing device 211 in FIG. 2.

An image forming apparatus 100 illustrated in FIG. 3 includes an electrophotographic photoreceptor 107 (image holding member); a charging device 108 that charges the electrophotographic photoreceptor 107, such as a charging roller; a power source 109 connected to the charging device 108; an exposure device 110 (electrostatic charge image forming unit) that exposes the electrophotographic photoreceptor 107 charged by the charging device 108 to light to form an electrostatic charge image; a developing device 111 (developing unit) that develops the electrostatic charge image formed by the exposure device 110 with a developer to form a toner image; a transfer device 112 (transfer unit) that transfers the toner image formed by the developing device 111 to a recording medium 300; a cleaning device 113 that removes toner remaining on the electrophotographic photoreceptor 107 after the transfer; a charge erasing device 114; and a temporary fixing device 115 (temporary fixing unit).

In FIG. 3, the cleaning device 113 is a brush cleaning device, and toner remaining on the electrophotographic photoreceptor 107 is removed with a brush member. The temporary fixing device 115 is a pressure-fixing device and does not have a heating unit.

Each of the devices used in the image forming apparatus 100 may be a device used in typical image forming apparatuses.

The temporary fixing device 115 may be a fixing device used in typical image forming apparatuses.

In the exemplary embodiments, the image forming apparatus may be free from the charge erasing device 114. In FIG. 3, the charging device 108 is a contact-type charging device but may be a non-contact-type charging device such as a corotron charging device.

Toner Cartridge and Process Cartridge

A toner cartridge used in the exemplary embodiments (also referred to as "adhesive material cartridge") accommodates at least the adhesive material according to the exemplary embodiments, which is a toner used for developing an electrostatic charge image.

The toner cartridge used in the exemplary embodiments may accommodate the adhesive material according to the exemplary embodiments, which is a toner used for developing an electrostatic charge image, as the electrostatic charge image developer.

The process cartridge used in the exemplary embodiments (also referred to as "adhesive material process cartridge") includes a developer carrier and accommodates at least the adhesive material according to the exemplary embodiments, which is a toner used for developing an electrostatic charge image, or the electrostatic charge image developer used in the exemplary embodiments.

It is suitable that the toner cartridge used in the exemplary embodiments be removably attached to an image forming apparatus. In other words, the toner cartridge used in the exemplary embodiments and accommodating the adhesive material according to the exemplary embodiments, which is a toner used for developing an electrostatic charge image, is suitably used in an image forming apparatus having a structure that enables the toner cartridge to be removably attached.

The toner cartridge may be a cartridge accommodating toner and a carrier or may be a combination of a cartridge independently accommodating the toner and a cartridge independently accommodating the carrier.

The process cartridge used in the exemplary embodiments is suitably detachable from an image forming apparatus.

The process cartridge used in the exemplary embodiments may optionally further include other units such as a charge erasing unit.

The toner cartridge and the process cartridge may have any of known structures and may have a structure, for example, disclosed in Japanese Unexamined Patent Application Publications No. 2008-209489 or 2008-233763.

EXAMPLES

The exemplary embodiments will now be described further in detail with reference to Examples and Comparative Example but are not limited thereto. The terms "part" and "%" are on a mass basis unless otherwise specified.

Preparation of Core Forming Resin Particles
Preparation of Dispersion Liquid (A1) of Core Forming Resin Particles
  Styrene: 450 parts
  2-ethylhexyl acrylate: 135 parts
  Acrylic acid: 12 parts
  Dodecanthiol: 9 parts These materials are mixed with each other and dissolved to prepare a solution.

This solution is added to another solution of 10 parts of an anionic surfactant (DOWFAX2A1 manufactured by The Dow Chemical Company) in 250 parts of ion exchanged water and then dispersed and emulsified in a flask (monomer emulsified liquid A).

Another solution of 1 part of an anionic surfactant (DOWFAX2A1 manufactured by The Dow Chemical Company) in 555 parts of ion exchanged water is prepared and put into a polymerization flask.

The polymerization flask is provided with a reflux tube. The polymerization flask is heated to 75° C. in a water bath under slow stirring while nitrogen is supplied thereto, and the flask is held in this state.

A solution of 9 parts of ammonium persulfate in 43 parts of ion exchanged water is dropped into the polymerization flask with a metering pump over 20 minutes. Then, the monomer emulsified liquid A is dropped into the polymerization flask with a metering pump over 200 minutes.

Then, the polymerization flask is maintained to be 75° C. for 3 hours under stirring to terminate the first phase of the polymerization. A precursor of a dispersion liquid (A1) of core forming resin particles has been produced through this process, and particles thereof have the following properties: volume average particle size of 190 nm, glass transition temperature of 53° C., and weight average molecular weight of 33,000.

After the temperature decreases to room temperature, 600 parts of 2-ethylhexyl acrylate and 850 parts of ion exchanged water are put into the polymerization flask and slowly stirred for 2 hours. Then, the temperature is increased to 70° C. while the stirring is continued, and 4.5 parts of ammonium persulfate and 110 parts of ion exchanged water are dropped thereto with a metering pump over 20 minutes. The resulting product is subsequently maintained for three hours under stirring to terminate the polymerization. Through this process, the dispersion liquid (A1) of core forming resin particles having the following properties has been produced: volume average particle size of 260 nm, weight average molecular weight of 200,000, and solid content of 33 mass %.

The resin particles of the produced dispersion liquid of the core forming resin particles are dried and then embedded into an epoxy resin to form a sample. The sample is cut with a diamond knife to produce a cross-sectional slice of the resin particles. The section of the sample is dyed with ruthenium tetroxide vapors and then observed with a transmission electron microscope. Result of the observation of the section of the resin particles shows that the resin particles have a structure in which multiple domains of a low-Tg (meth)acrylate resin have been dispersed in a high-Tg styrene resin as the matrix.

The glass transition temperature Tg behavior of the dried resin particles is analyzed from −150° C. with a differential scanning calorimeter (DSC) manufactured by SHIMADZU CORPORATION, and the glass transition of the low-Tg (meth)acrylate resin is observed at −70° C. In addition, the glass transition of the high-Tg styrene resin is observed at 53° C. (difference in glass transition temperature: 123° C.)

Preparation of Dispersion Liquid (A2) of Core Forming Resin Particles

Except that n-butyl acrylate is used in place of 2-ethylhexyl acrylate, a dispersion liquid (A2) of core forming resin particles having the following properties is produced as in the preparation of the dispersion liquid (A1) of core forming resin particles: volume average particle size of 265 nm and solid content of 33 mass %.

The section of the resin particles of the dispersion liquid of the core forming resin particles is observed as in the observation for the dispersion liquid (A1) of core forming resin particles, and result of the observation shows that the resin particles have a structure in which multiple domains of a low-Tg (meth)acrylate resin have been dispersed in a high-Tg styrene resin as the matrix.

The glass transition temperature Tg behavior of the dried resin particles is analyzed from −150° C. with a differential scanning calorimeter (DSC) manufactured by SHIMADZU CORPORATION, and the glass transition of the low-Tg (meth)acrylate resin is observed at −55° C. In addition, the glass transition of the high-Tg styrene resin is observed at 53° C. (difference in glass transition temperature: 108° C.)

Preparation of Dispersion Liquid (A3) of Core Forming Resin Particles

Except that ethyl acrylate is used in place of 2-ethylhexyl acrylate, a dispersion liquid (A3) of core forming resin particles having the following properties is produced as in the preparation of the dispersion liquid (A1) of core forming resin particles: volume average particle size of 268 nm and solid content of 33 mass %.

The section of the resin particles of the dispersion liquid of the core forming resin particles is observed as in the observation for the dispersion liquid (A1) of core forming resin particles, and result of the observation shows that the resin particles have a structure in which multiple domains of a low-Tg (meth)acrylate resin have been dispersed in a high-Tg styrene resin as the matrix.

The glass transition temperature Tg behavior of the dried resin particles is analyzed from −150° C. with a differential scanning calorimeter (DSC) manufactured by SHIMADZU CORPORATION, and the glass transition of the low-Tg (meth)acrylate resin is observed at −20° C. In addition, the glass transition of the high-Tg styrene resin is observed at 53° C. (difference in glass transition temperature: 73° C.)

Preparation of Dispersion Liquid (A4) of Core Forming Resin Particles

Styrene: 450 parts
n-butyl acrylate: 135 parts
Acrylic acid: 12 parts
Dodecanthiol: 9 parts
Allyl methacrylate: 20 parts These materials are mixed with each other and dissolved to prepare a solution.

This solution is added to another solution of 10 parts of an anionic surfactant (DOWFAX2A1 manufactured by The Dow Chemical Company) in 250 parts of ion exchanged water and then dispersed and emulsified in a flask (monomer emulsified liquid A).

Another solution of 1 part of an anionic surfactant (DOWFAX2A1 manufactured by The Dow Chemical Company) in 555 parts of ion exchanged water is prepared and put into a polymerization flask.

The polymerization flask is provided with a reflux tube. The polymerization flask is heated to 75° C. in a water bath under slow stirring while nitrogen is supplied thereto, and the flask is held in this state.

A solution of 9 parts of ammonium persulfate in 43 parts of ion exchanged water is dropped into the polymerization flask with a metering pump over 20 minutes. Then, the monomer emulsified liquid A is dropped into the polymerization flask with a metering pump over 200 minutes.

Then, the polymerization flask is maintained to be 75° C. for 3 hours under stirring to terminate the first phase of the polymerization. A precursor of a dispersion liquid (A4) of core forming resin particles has been produced through this process, and particles thereof have the following properties: volume average particle size of 190 nm, glass transition temperature of 58° C., and weight average molecular weight of 33,000.

After the temperature decreases to room temperature, 600 parts of 2-ethylhexyl acrylate and 850 parts of ion exchanged water are put into the polymerization flask and slowly stirred for 2 hours. Then, the temperature is increased to 70° C. while the stirring is continued, and 4.5 parts of ammonium persulfate and 110 parts of ion exchanged water are dropped thereto with a metering pump over 20 minutes. The resulting product is subsequently maintained for three hours under stirring to terminate the polymerization. Through this process, the dispersion liquid (A4) of core forming resin particles having the following properties has been produced: volume average particle size of 260 nm, weight average molecular weight of 180,000, and solid content of 33 mass %.

The section of the resin particles of the dispersion liquid of the core forming resin particles is observed as in the observation for the dispersion liquid (A1) of core forming resin particles, and result of the observation shows that the resin particles have a structure in which multiple domains of a low-Tg (meth)acrylate resin have been dispersed in a high-Tg styrene resin as the matrix.

The glass transition temperature Tg behavior of the dried resin particles is analyzed from −150° C. with a differential scanning calorimeter (DSC) manufactured by SHIMADZU CORPORATION, and the glass transition of the low-Tg (meth)acrylate resin is observed at −70° C. In addition, the glass transition of the high-Tg styrene resin is observed at 56° C. (difference in glass transition temperature: 126° C.)

Preparation of Dispersion Liquid (A5) of Core Forming Resin Particles

Except that 135 parts of 2-ethylhexyl acrylate and 20 parts of allyl methacrylate are used in combination instead of 135 parts of the 2-ethylhexyl acrylate, a dispersion liquid (A5) of core forming resin particles having the following properties is produced as in the preparation of the dispersion liquid (A1) of core forming resin particles: volume average particle size of 250 nm and solid content of 33 mass %.

The section of the resin particles of the dispersion liquid of the core forming resin particles is observed as in the observation for the dispersion liquid (A1) of core forming resin particles, and result of the observation shows that the resin particles have a structure in which multiple domains of a low-Tg (meth)acrylate resin have been dispersed in a high-Tg styrene resin as the matrix.

The glass transition temperature Tg behavior of the dried resin particles is analyzed from −150° C. with a differential scanning calorimeter (DSC) manufactured by SHIMADZU CORPORATION, and the glass transition of the low-Tg (meth)acrylate resin is observed at −50° C. In addition, the glass transition of the high-Tg styrene resin is observed at 53° C. (difference in glass transition temperature: 103° C.)

Preparation of Dispersion Liquid of Shell Forming Resin Particles

Preparation of Dispersion Liquid (B1) of Shell Forming Resin Particles

Styrene: 450 parts
n-butylacrylate: 135 parts
Allyl methacrylate: 18 parts
Acrylic acid: 12 parts Dodecanthiol: 9 parts These materials are mixed with each other and dissolved to prepare a solution.

This solution is added to another solution of 10 parts of an anionic surfactant (DOWFAX2A1 manufactured by The Dow Chemical Company) in 250 parts of ion exchanged water and then dispersed and emulsified in a flask (monomer emulsified liquid A).

Another solution of 1 part of an anionic surfactant (DOWFAX2A1 manufactured by The Dow Chemical Company) in 555 parts of ion exchanged water is prepared and put into a polymerization flask.

The polymerization flask is provided with a reflux tube. The polymerization flask is heated to 75° C. in a water bath under slow stirring while nitrogen is supplied thereto, and the flask is held in this state.

A solution of 9 parts of ammonium persulfate in 43 parts of ion exchanged water is dropped into the polymerization flask with a metering pump over 20 minutes. Then, the monomer emulsified liquid A is dropped into the polymerization flask with a metering pump over 200 minutes.

Then, the polymerization flask is maintained to be 75° C. for 3 hours under stirring to terminate the first phase of the polymerization. A dispersion liquid (B1) of shell forming resin particles has been produced through this process, and particles thereof have the following properties: volume average particle size of 190 nm, glass transition temperature of 53° C., weight average molecular weight of 33,000, and solid content of 42 mass %.

Preparation of Dispersion Liquid (B2) of Shell Forming Resin Particles

Styrene: 450 parts
n-butylacrylate: 90 parts
Acrylic acid: 12 parts
Dodecanthiol: 9 parts These materials are mixed with each other and dissolved to prepare a solution.

This solution is added to another solution of 10 parts of an anionic surfactant (DOWFAX2A1 manufactured by The Dow Chemical Company) in 250 parts of ion exchanged water and then dispersed and emulsified in a flask (monomer emulsified liquid A).

Another solution of 1 part of an anionic surfactant (DOWFAX2A1 manufactured by The Dow Chemical Company) in 555 parts of ion exchanged water is prepared and put into a polymerization flask.

The polymerization flask is provided with a reflux tube. The polymerization flask is heated to 75° C. in a water bath under slow stirring while nitrogen is supplied thereto, and the flask is held in this state.

A solution of 9 parts of ammonium persulfate in 43 parts of ion exchanged water is dropped into the polymerization flask with a metering pump over 20 minutes. Then, the monomer emulsified liquid A is dropped into the polymerization flask with a metering pump over 200 minutes.

Then, the polymerization flask is maintained to be 75° C. for 3 hours under stirring to terminate the first phase of the polymerization. A dispersion liquid (B2) of shell forming resin particles has been produced through this process, and particles thereof have the following properties: volume average particle size of 190 nm, glass transition temperature of 85° C., weight average molecular weight of 36,000, and solid content of 42 mass %.

Preparation of Dispersion Liquid (B3) of Shell Forming Resin Particles

Except that 37 parts of allyl methacrylate is used, a dispersion liquid (B3) of shell forming resin particles having the following properties is produced as in the preparation of the dispersion liquid (B1) of shell forming resin particles: volume average particle size of 200 nm, glass transition temperature of 62° C., weight average molecular weight of 38,000, and solid content of 42 mass %.

Preparation of Dispersion Liquid (B4) of Shell Forming Resin Particles

Styrene: 450 parts
n-butylacrylate: 150 parts
Acrylic acid: 12 parts
Dodecanthiol: 9 parts These materials are mixed with each other and dissolved to prepare a solution.

This solution is added to another solution of 10 parts of an anionic surfactant (DOWFAX2A1 manufactured by The Dow Chemical Company) in 250 parts of ion exchanged water and then dispersed and emulsified in a flask (monomer emulsified liquid A).

Another solution of 1 part of an anionic surfactant (DOWFAX2A1 manufactured by The Dow Chemical Company) in 555 parts of ion exchanged water is prepared and put into a polymerization flask.

The polymerization flask is provided with a reflux tube. The polymerization flask is heated to 75° C. in a water bath under slow stirring while nitrogen is supplied thereto, and the flask is held in this state.

A solution of 9 parts of ammonium persulfate in 43 parts of ion exchanged water is dropped into the polymerization flask with a metering pump over 20 minutes. Then, the monomer emulsified liquid A is dropped into the polymerization flask with a metering pump over 200 minutes.

Then, the polymerization flask is maintained to be 75° C. for 3 hours under stirring to terminate the first phase of the polymerization. A dispersion liquid (B4) of shell forming resin particles has been produced through this process, and particles thereof have the following properties: volume average particle size of 190 nm, glass transition temperature of 49° C., weight average molecular weight of 31,000, and solid content of 40 mass %.

Example 1

Dispersion liquid (A1) of core forming resin particles: 504 parts

Ion exchanged water: 710 parts Anionic surfactant (DOWFAX2A1 manufactured by The Dow Chemical Company): 1 part Oxidatively polymerizable compound (linseed oil): 36 parts These materials as core forming materials are put into a 3-liter reaction vessel equipped with a thermometer, a pH meter, a stirrer; and 1.0% nitric acid is added thereto to adjust pH to be 3.0. Then, 23 parts of a separately prepared aqueous solution of aluminum sulfate is added to the mixture, while the mixture is dispersed at 25° C. and 5,000 rpm with a homogenizer (ULTRA-TURRAX T50 manufactured by IKA Works, Inc.). The dispersion is continued for six minutes.

The reactor vessel is subsequently provided with a mantle heater. The temperature is increased at a temperature increase rate of 0.2° C./min until 40° C. and then at 0.05° C./min after 40° C., while the rotational rate of the stirrer is adjusted so that the slurry is sufficiently stirred. The particle size is measured with MULTISIZER II (aperture diameter of 50 μm, manufactured by Beckman Coulter, Inc.) with every 10 minutes. The temperature is maintained when the measured volume average particle size reaches 5.0 μm, and 170 parts of the dispersion liquid (B1) of shell forming resin particles as a shell forming material is added thereto over 5 minutes. The resulting product is maintained for 30 minutes, and then the pH thereof is adjusted with a 1% aqueous solution of sodium hydroxide to be 9.0. The temperature is increased up to 90° C. at a temperature increase rate of 1° C./min, while the pH is adjusted in the same manner to be 9.0 with every temperature increase of 5° C. Then, the temperature is increased up to 98° C. and maintained. The shape and surface nature of the particles are observed with an optical microscope and a field emission-scanning electron microscope (FE-SEM). After 10 hours, the coalescence of the particles is observed, and then the vessel is cooled to 30° C. with cooling water over 5 minutes.

The cooled slurry is filtered through a nylon mesh having an aperture size of 15 µm to remove coarse particles, and an adhesive material slurry that has passed through the mesh is filtered under reduced pressure with an aspirator. The adhesive material remaining on the filter paper is crushed as finely as possible by hand and added at 30° C. to ion exchanged water of which the amount is 10 times the amount of the adhesive material, and the resulting product is mixed by stirring for 30 minutes. Then, the mixture is filtered under reduced pressure with an aspirator. The adhesive material remaining on the filter paper is crushed as finely as possible by hand and added at 30° C. to ion exchanged water of which the amount is 10 times the amount of the adhesive material, and the resulting product is mixed by stirring for 30 minutes. The mixture is subsequently filtered again under reduced pressure with an aspirator, and the electrical conductivity of the filtrate is measured. This procedure is repeated until the electrical conductivity of the filtrate reaches 10 µS/cm or less, followed by washing the adhesive material. The washed adhesive material is finely crushed with a wet/dry granulator (COMIL) and are vacuum-dried in an oven at 35° C. for 36 hours to yield adhesive material particles. The adhesive material particles have a volume average particle size of 5.8 µm.

Then, 1.5 parts of hydrophobic silica (RY50, manufactured by NIPPON AEROSIL CO., LTD.) is added to 100 parts of the adhesive material particles, and the resulting product is mixed using a sample mill at 13000 rpm for 30 seconds. The mixture is screened with a vibrating sieve having an aperture size of 45 µm to yield an adhesive material of Example 1.

Examples 2 to 14 and Comparative Example 1

Except that the types and amounts of the core forming materials (core forming resin particles and oxidatively polymerizable compound) and shell forming material (dispersion liquid of shell forming resin particles) are changed as shown in Table 2, adhesive materials of Examples 2 to 14 and Comparative Example 1 are produced as in the production of the adhesive material of Example 1.
Measurement The adhesive materials of Examples and Comparative Example are analyzed to determine the presence of a sea-island structure, the longer diameter of the island portion, and the thickness of the shell layer in the above-mentioned manners.

The adhesive materials of Examples and Comparative Example are individually pressured at 30 MPa and left to stand for 5 hours, and then the complex modulus thereof is measured in the above-mentioned manner. The difference in the complex modulus before and after the adhesive materials are left to stand for 5 hours is determined and shown in Table 2.

Results of the analysis shows that the adhesive materials of Examples have a sea-island structure that includes a sea portion containing a high-Tg styrene resin and an island portion containing a low-Tg (meth)acrylate resin.
Evaluation
Production of Developer Into a 2-liter V blender, 36 parts of the adhesive materials of individual Examples and Comparative Example and 414 parts of a carrier are put. The content is stirred for 20 minutes and then screened with a 212-µm sieve to produce developers of individual Examples and Comparative Example. The carrier is the following resin coated carrier.
Preparation of Resin Coated Carrier Mn—Mg—Sr ferrite particles (average particle size of 40 µm): 100 parts Toluene: 14 parts Methyl polymethacrylate: 2.0 parts Carbon black (VXC72, manufactured by Cabot Corporation): 0.12 parts The materials other than the ferrite particles are stirred together with glass beads (4): 1 mm, the same amount as toluene) at 1200 rpm for 30 minutes with a sand mill manufactured by Kansai Paint Co., Ltd. to produce a solution for forming a resin coating layer. The solution for forming a resin coating layer and the ferrite particles are put into a vacuum degassing kneader, and pressure is reduced. Then, the toluene is distilled away, and the resulting product is dried to prepare a resin coated carrier.
Preparation of Evaluation Apparatus The developers of Examples and Comparative Example are put into the developing device of a modified machine of DOCUPRINT C2425 manufactured by Fuji Xerox Co., Ltd. In this modified machine, a twin-roller fixing device is modified so that the maximum of fixing pressure is 5 MPa (50 kgf/cm²), and a process speed is adjusted to be 180 mm/sec. The fixing device of the modified machine does not have a heat source. In addition, the modified machine is provided with a brush cleaner that removes an adhesive material remaining on the photoreceptor after a transfer process.

The modified machine is used as an evaluation apparatus, and the following evaluation is performed. Table 2 shows results of the evaluations.
Evaluation of Peel Strength in High Humidity Environment Peel strength is measured as follows and evaluated on the basis of the following evaluation criteria.
Measurement of Peel Force An image including both characters and pictures is formed at an area density of 30% on postcard paper V424 manufactured by Fuji Xerox Co., Ltd with DOCUCENTRE C7550I manufactured by Fuji Xerox Co., Ltd and then fixed.

The postcard paper is cut in the size of a postcard so as to have this image and fixed to the flat plate of an apparatus for testing application of powder. The postcard is slid under a magnetic roller while a bias voltage of 300 V is applied. Then, a layer of the adhesive material is formed on the fixed image at 4 g/m².

The image is temporarily fixed by being passed between a pair of 160-mm-wide stainless-steel rollers of which a pressure of 100 kg is applied to the both ends (nip width in passage of paper: 1 mm and applied pressure of approximately 12.3 MPa). The postcard paper is folded in half such that the temporarily fixed image comes inside and pressure-bonded by being passed between the stainless-steel rollers of which a pressure of 300 kg is applied to the both ends (nip width in passage of paper: 1 mm and applied pressure of approximately 36.9 MPa). The temporary fixing and the pressure-bonding are performed without heating the rollers.

The pressure-bonded paper in the size of a postcard is left to stand for 24 hours in a high humidity environment (temperature: 28° C. and relative humidity: 85% RH). The pressure bonded paper in the size of a postcard is cut in the longitudinal direction to form a rectangular sample having a width of 15 mm, and the peel force of the sample is measured by a known method (90° peeling test method). Result of the measurement is evaluated on the basis of the following criteria.
Evaluation Criteria

TABLE 1

Characteristics of Core Forming Resin Particles

| No | Tg1 of high-Tg styrene resin (° C.) | Tg2 of low-Tg (meth)acrylate resin (° C.) | Difference between Tg1 and Tg2 (° C.) | Remarks |
|---|---|---|---|---|
| (A1) | 53 | −70 | 123 | |
| (A2) | 53 | −55 | 108 | |
| (A3) | 53 | −20 | 73 | |
| (A4) | 56 | −70 | 126 | High Tg-Allyl (8 mmol %) |
| (A5) | 53 | −50 | 103 | Low Tg-Allyl (8 mmol %) |

TABLE 2

| | Core forming material | | Oxidatively polymerizable compound content relative to total | Shell layer forming material | | Toner characteristics | | | Evaluation |
|---|---|---|---|---|---|---|---|---|---|
| | Dispersion liquid of core forming resin particles Type/amount | Oxidatively polymerizable compound Type/amount | content of styrene resin, (meth)acrylate resin, and oxidatively polymerizable compound % | Dispersion liquid of shell layer forming resin particles Type/amount | Sea-island structure | Complex modulus of adhesive material (Pa) | Difference in complex modulus of adhesive material between before and after being left for 5 h (Pa) | | Peel strength at high temperature high humidity |
| Example 1 | (A1)/504 | (OPC1)/36 | 13 | (B1)/170 | Exist | $5 \times 10^7$ | $6.5 \times 10^7$ | | A: 1.1N |
| Example 2 | (A1)/504 | (OPC2)/49 | 17 | (B1)/170 | Exist | $7 \times 10^7$ | $6.5 \times 10^7$ | | A: 1.2N |
| Example 3 | (A1)/504 | (OPC3)/29 | 11 | (B1)/170 | Exist | $2 \times 10^7$ | $3.2 \times 10^7$ | | B: 0.8N |
| Example 4 | (A1)/504 | (OPC4)/29 | 11 | (B1)/170 | Exist | $2 \times 10^7$ | $3.2 \times 10^7$ | | B: 0.8N |
| Example 5 | (A2)/504 | (OPC1)/36 | 13 | (B1)/170 | Exist | $2 \times 10^7$ | $3.2 \times 10^7$ | | B: 0.8N |
| Example 6 | (A3)/504 | (OPC1)/36 | 13 | (B1)/170 | Exist | $8 \times 10^6$ | $1.5 \times 10^7$ | | B: 0.5N |
| Example 7 | (A1)/504 | (OPC1)/36 | 13 | (B2)/170 | Exist | $9 \times 10^6$ | $1.5 \times 10^7$ | | B: 0.6N |
| Example 8 | (A4)/504 | (OPC1)/36 | 13 | (B1)/170 | Exist | $2 \times 10^8$ | $4.3 \times 10^8$ | | A: 1.1N |
| Example 9 | (A5)/504 | (OPC1)/36 | 13 | (B1)/170 | Exist | $9 \times 10^7$ | $4.0 \times 10^8$ | | A: 1.2N |
| Example 10 | (A1)/504 | (OPC1)/36 | 13 | (B3)/170 | Exist | $4 \times 10^8$ | $4.5 \times 10^8$ | | A: 1.2N |
| Comparative Example 1 | (A1)/504 | None | 0 | (B1)/170 | Exist | $1 \times 10^5$ | 0 | | C: 0.1N |
| Example 11 | (A1)/504 | (OPC1)/36 | 13 | (B4)/170 | Exist | $1 \times 10^7$ | $3.0 \times 10^7$ | | B: 0.7N |
| Example 12 | (A1)/504 | (OPC1)/15 | 6 | (B1)/170 | Exist | $8 \times 10^6$ | $1.5 \times 10^7$ | | B: 0.5N |
| Example 13 | (A1)/504 | (OPC1)/52 | 18 | (B1)/170 | Exist | $4 \times 10^6$ | $4.0 \times 10^7$ | | A: 1.0N |
| Example 14 | (A1)/504 | (OPC1)/92 | 28 | (B1)/170 | Exist | $2 \times 10^7$ | $3.2 \times 10^7$ | | B: 0.8N |

A: Peel force of 1 N or more

B: Peel force of 0.2 N or more and less than 1 N

C: Peel force of less than 0.2 N

Tables 1 and 2 show the details of Examples and Comparative Example. The abbreviations in Tables 1 and 2 are as follows.
Remarks Column High Tg-Allyl: high-Tg styrene resin has an allyl group, the number in the parentheses refers to the amount of the allyl group relative to the resin (mmol %)

Low Tg-Allyl: low-Tg (meth)acrylate resin has an allyl group, the number in the parentheses refers to the amount of the allyl group relative to the resin (mmol %)

Allyl: resin in the shell layer has an allyl group, the number in the parentheses refers to the amount of the allyl group relative to the resin (mmol %) Oxidatively Polymerizable Compound Column OPC1: linseed oil OPC2: safflower oil OPC3: urushiol OPC4: cardanol The results in the tables show that a reduction in an adhesive force is suppressed in a high temperature and high humidity environment in Examples as compared with Comparative Example.

In addition, a reduction in an adhesive force is suppressed more in Examples in which resins having an allyl group are used than in other Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An adhesive material comprising:
a binder resin; and
an oxidatively polymerizable compound, wherein the binder resin includes a styrene resin and a (meth)acrylate resin, a content proportion of a total mass of the styrene resin and the (meth)acrylate resin is 85 mass % when a total mass of the binder resin is considered to be 100 mass %, the adhesive material has a sea-island structure that includes a sea portion containing the styrene resin and an island portion containing the (meth)acrylate resin, a glass transition temperature of the (meth)acrylate resin is at least 30° C. lower than a glass transition temperature of the styrene resin, and an amount of the oxidatively polymerizable compound is in a range of 5 parts by mass to 30 parts by mass relative to 100 parts by mass of a total amount of the styrene resin, the (meth)acrylate resin, and the oxidatively polymerizable compound.

2. The adhesive material according to claim 1, wherein the oxidatively polymerizable compound is selected from the group consisting of a phenol derivative in which an aliphatic hydrocarbon group having an ethylenic double bond is bonded to a phenol and a drying oil.

3. Adhesive material according to claim 2, wherein the oxidatively polymerizable compound is a drying oil.

4. The adhesive material according to claim 3, wherein a complex modulus of the adhesive material at 60° C. is in a range of $5 \times 10^6$ Pa to $5 \times 10^8$ Pa, which is measured by a rheometer under a condition that the adhesive material is pressured at 30 MPa and left to stand for 5 hours.

5. The adhesive material according to claim 4, wherein the adhesive material is used to produce a pressure-bonded print.

6. The adhesive material according to claim 4, wherein a content of the allyl group is from 1 mmol % to 20 mmol %.

7. The adhesive material according to claim 1, wherein a mass ratio of the (meth)acrylate resin to the styrene resin is 0.25 or more and less than 1.5.

8. The adhesive material according to claim 7, wherein the amount of the oxidatively polymerizable compound is in a range of 10 parts by mass to 20 parts by mass.

9. The adhesive material according to claim 1, wherein a complex modulus of the adhesive material at 60° C. is in the range of $5 \times 10^6$ Pa to $5 \times 10^8$ Pa, which is measured by a rheometer under a condition that the adhesive material is pressured at 30 MPa and left to stand for 5 hours.

10. The adhesive material according to claim 1, wherein the adhesive material is used to produce a pressure-bonded print.

11. The adhesive material according to claim 1, wherein the (meth)acrylate resin comprises a monomer having an allyl group.

12. The adhesive material according to claim 11, wherein a content of the allyl group in the (meth)acrylate resin is from 1 mmol % to 20 mmol %.

13. The adhesive material according to claim 11, wherein a content of the allyl group in the styrene resin is from 1 mmol % to 20 mmol %.

14. The adhesive material according to claim 1, wherein the styrene resin comprises a monomer having an allyl group.

15. A pressure-bonded print comprising:
two substrates; and
the adhesive material according to claim 1 disposed between the two substrates.

16. The pressure-bonded print according to claim 15, wherein the oxidatively polymerizable compound used in the adhesive material is selected from the group consisting of a phenol derivative in which an aliphatic hydrocarbon group having an ethylenic double bond is bonded to a phenol and a drying oil.

17. The pressure-bonded print according to claim 15, wherein a mass ratio of the (meth)acrylate resin to the styrene resin is 0.25 or more and less than 1.5 in the adhesive material, and an amount of the oxidatively polymerizable compound is in a range of 5 parts by mass to 30 parts by mass relative to 100 parts by mass of a total amount of the styrene resin, the (meth)acrylate resin, and the oxidatively polymerizable compound.

18. The pressure-bonded print according to claim 15, wherein a complex modulus of the adhesive material at 60° C. is in a range of $5 \times 10^6$ Pa to $5 \times 10^8$ Pa, which is measured by a rheometer under a condition that the adhesive material is pressured at 30 MPa and left to stand for 5 hours.

19. A pressure-bonded print comprising:
a folded substrate; and
the adhesive material according to claim 1 disposed on the folded inside of the substrate.

* * * * *